United States Patent
Mihara et al.

(10) Patent No.: US 6,744,564 B2
(45) Date of Patent: Jun. 1, 2004

(54) ZOOM LENS, AND ELECTRONIC IMAGING SYSTEM USING THE SAME

(75) Inventors: Shinichi Mihara, Tama (JP); Azusa Noguchi, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/294,775

(22) Filed: Nov. 15, 2002

(65) Prior Publication Data

US 2003/0189762 A1 Oct. 9, 2003

(30) Foreign Application Priority Data

Nov. 16, 2001 (JP) ........................................ 2001-351623

(51) Int. Cl.$^7$ ............................................. G02B 15/14
(52) U.S. Cl. ........................ 359/680; 359/682; 359/681
(58) Field of Search ................................. 359/680, 681, 359/682

(56) References Cited

U.S. PATENT DOCUMENTS 6,308,011 B1   10/2001   Wachi et al. ................. 396/72
2003/0169509 A1 * 9/2003   Iyama ........................ 359/680

FOREIGN PATENT DOCUMENTS

| EP | 1 093 000 | 4/2001 |
| EP | 1 096 287 | 5/2001 |
| JP | 2000-267009 | 9/2000 |

* cited by examiner

Primary Examiner—Georgia Epps
Assistant Examiner—M. Hasan
(74) Attorney, Agent, or Firm—Kenyon & Kenyon

(57) ABSTRACT

The invention provides a zoom lens that operates in such a zooming mode and zoom arrangement that the number of lens elements is reduced to make the total thickness of each lens group thin while stable yet high image-formation capability is maintained, thereby achieving thorough size reductions in video cameras or digital cameras, and an electronic imaging system using the same. The zoom lens comprises a first lens group G1 of negative refracting power, a second lens group G2 of positive refracting power and a third lens group G3 of positive refracting power. For zooming from the wide-angle end to the telephoto end of the zoom lens upon focused on an infinite object point, the second lens group G2 moves toward the object side alone of the zoom lens, and the third lens group G3 moves in a locus different from that of the second lens group while the spacing between adjacent lens groups varies. The second lens group G2 is composed of two lens components, i.e., an object side-lens component and an image side-lens component, one of which is composed of a cemented lens component consisting of a positive lens element and a negative lens element, and the other consists only of a single lens component. The object side-lens component satisfies condition (1) concerning the axial radius-of-curvature ratio between the object side-surface and the image side-surface.

29 Claims, 14 Drawing Sheets

C : Cyan   M : Magenta
Ye : Yellow   G : Green

Wavelength (nm)

ZOOM LENS, AND ELECTRONIC IMAGING SYSTEM USING THE SAME

This application claims benefits of Japanese Application No. 2001-351623 filed in Japan on Nov. 16, 2001, the contents of which are incorporated by this reference.

BACKGROUND OF THE INVENTION

The present invention relates generally to a zoom lens and an electronic imaging system that incorporates the same, and more particularly to a zoom lens, the depth dimension of which is diminished by providing some contrivances to an optical system portion such as a zoom lens and an electronic imaging system using the same, such as a video or digital camera. According to the present invention, the zoom lens is also designed to be capable of rear focusing.

In recent years, digital cameras (electronic cameras) have received attention as cameras of the next generation, an alternative to silver-halide 35 mm-film (usually called Leica format) cameras. Currently available digital cameras are broken down into some categories in a wide range from the high-end type for commercial use to the portable low-end type. In view of the category of the portable low-end type in particular, the primary object of the present invention is to provide the technology for implementing video or digital cameras whose depth dimension is reduced while high image quality is ensured.

The gravest bottleneck in diminishing the depth dimension of cameras is the thickness of an optical system, especially a zoom lens system from the surface located nearest to its object side to an image pickup plane. To make use of a collapsible lens mount that allows the optical system to be taken out of a camera body for photo-taking and received therein for carrying now becomes mainstream. However, the thickness of an optical system received in a collapsible lens mount varies largely with the lens type or filters used. Especially in the case of a so-called +precedent type zoom lens wherein a lens group having positive refracting power is positioned nearest to its object side, the thickness of each lens element and dead space are too large to set such requirements as zoom ratios and F-numbers at high values; in other words, the optical system does not become thin as expected, even upon received in the lens mount (JP-A 11-258507). A − precedent type zoom lens, especially of two or three-group construction is advantageous in this regard. However, this type zoom lens, too, does not become slim upon received in a collapsible lens mount, even when the lens positioned nearest to the object side is formed of a positive lens (JP-A 11-52246), because the lens groups are each composed of an increased number of lens elements, and the thickness of lens elements is large. Among zoom lenses known so far in the art, those set forth typically in JP-A's 11-287953, 2000-267009 and 2000-275520 are suitable for use with electronic imaging systems with improved image-formation capabilities including zoom ratios, angles of view and F-numbers, and may possibly be reduced in thickness upon received in collapsible lens mounts.

To make the first lens group thin, it is preferable to make an entrance pupil position shallow; however, the magnification of the second lens group must be increased to this end. For this reason, some considerable load is applied on the second lens group. Thus, it is not only difficult to make the second lens group itself thin but it is also difficult to make correction for aberrations. In addition, the influence of production errors grows. Thickness and size reductions may be achieved by making the size of an image pickup device small. To ensure the same number of pixels, however, the pixel pitch must be diminished and insufficient sensitivity must be covered by the optical system. The same goes true for the influence of diffraction.

To obtain a camera body whose depth dimension is reduced, a rear focusing mode wherein the rear lens group is moved for focusing is effective in view of the layout of a driving system. It is then required to single out an optical system less susceptible to aberration fluctuations upon rear focusing.

SUMMARY OF THE INVENTION

In view of such problems as referred to above, the primary object of the invention is to thoroughly slim down a video or digital camera by singling out a zoom mode or zoom construction wherein a reduced number of lens elements are used to reduce the size of a zoom lens and simplify the layout thereof and stable yet high image-formation capabilities are kept over an infinite-to-nearby range, and optionally making lens elements thin thereby reducing the total thickness of each lens group and slimming down a zoom lens thoroughly by selection of filters.

According to the present invention, the aforesaid object is achievable by the provision of a zoom lens comprising, in order from an object side thereof, a first lens group having negative refracting power, a second lens group having positive refracting power and a third lens group having positive refracting power, wherein for zooming from a wide-angle end to a telephoto end of the zoom lens upon focused on an infinite object point, the second lens group moves toward the object side alone and the third lens group moves in a locus different from that of the second lens group with a varying spacing between adjacent lens groups, wherein:

the second lens group comprises two lens components, i.e., an object side-lens component and an image side-lens component, one of which is composed of a cemented lens component consisting of a positive lens element and a negative lens element and the other consists only of a positive single lens component, and the object side-lens component satisfies condition (1):

$$0.6 < R_{2FR}/R_{2FF} < 1.05 \tag{1}$$

where $R_{2FF}$ is the axial radius of curvature of the object side-surface of the object side-lens component in the second lens group, and $R_{2FR}$ is the axial radius of curvature of the image side-surface of the object side-lens component in the second lens group.

The advantages of, and the requirements for, the aforesaid zoom lens arrangement are now explained.

The zoom lens of the present invention comprises, in order from an object side thereof, a first lens group having negative refracting power, a second lens group having positive refracting power and a third lens group having positive refracting power. For zooming from the wide-angle end to the telephoto end of the zoom lens upon focused on an infinite object point, the second lens group moves toward the object side alone and the third lens group moves in a locus different from that of the second lens group with a varying spacing between the adjacent lens groups. The second lens group comprises two lens components, i.e., an object side-lens component and an image side-lens component, one of which is composed of a cemented lens component consisting of a positive lens element and a negative lens element and the other consists only of a positive single lens component (a two-component, three-lens arrangement).

Of two such lens components, the object side-lens component should preferably satisfy condition (1).

$$0.6 < R_{2FR}/R_{2FF} < 1.05 \tag{1}$$

Here $R_{2FF}$ is the axial radius of curvature of the object side-surface of the object side-lens component in the second lens group, and $R_{2FR}$ is the axial radius of curvature of the image side-surface of the object side-lens component in the second lens group.

In the present disclosure, the term "cemented lens" should be understood to comprise a plurality of lens elements wherein a lens element formed of a single medium is thought of as one unit, and the "lens component" should be understood to refer to a lens group with no air separation therein, i.e., a single lens or a cemented lens.

For reductions in the size of a two-group zoom lens of –+ construction commonly used as the zoom lens for long-standing silver-halide film cameras, it is preferable to increase the magnification of the positive rear group (the second lens group) at each focal length. To this end, it is already well known to locate an additional positive lens component as the third lens group on the image side of the second lens group, wherein the spacing between the second lens group and the third lens group is varied for zooming from the wide-angle end to the telephoto end. The third lens group has also the possibility of being used for focusing.

To attain the object of the invention, i.e., to diminish the total thickness of a lens portion upon received in a collapsible mount yet perform focusing at the third lens group, it is an essential requirement to reduce fluctuations of off-axis aberrations inclusive of astigmatism. To this end, the second lens group should be composed of two lens components, i.e., consist of, in order from its object side, an object side-lens component and an image side-lens component, one of which is composed of a cemented lens component consisting of a positive lens element and a negative lens element and the other consists only of a positive single lens element.

For focusing at the third lens group, aberration fluctuations become a problem. However, the incorporation of an aspheric surface in the third lens group in an amount than required is not preferable. This is because, to take advantage of that aspheric surface, astigmatism remaining at the first and second lens groups must be corrected at the third lens group. If, in this state, the third lens group moves for focusing, then aberrations are out of balance. Accordingly, when focusing is performed at the third lens group, astigmatism must be eradiated at the first and second lens group all over the zoom range.

It is thus preferable that the third lens group is constructed of a spherical lens component or a reduced amount of asphericity, an aperture stop is located on the object side of the second lens group, and the second lens group is composed of two lens components, that is, an object side-lens component and an image side-lens component, one of which is composed of a cemented lens component consisting of a positive lens element and a negative lens element and the other consists only of a positive single lens component (three lens elements in all).

Exceeding the upper limit to condition (1) may be favorable for correction of spherical aberrations, coma and astigmatism throughout the zoom lens, but causes the effect of cementing on slacking the sensitivity to decentration to become slender. As the lower limit is not reached, correction of spherical aberrations, coma and astigmatism throughout the zoom lens tends to become difficult.

More preferably, $$0.65 < R_{2FR}/R_{2FF} < 1.0 \tag{1}'$$

Most preferably, $$0.7 < R_{2FR}/R_{2FF} < 0.95 \tag{1}''$$

Of the aforesaid two lens components, it is preferable that the cemented lens component is defined by the object side-lens component with satisfaction of conditions (2), (3) and (4).

$$0 < L/R_{2FC} < 0.8 \tag{2}$$

$$0.01 < n_{2FN} - n_{2FP} < 0.2 \tag{3}$$

$$v_{2FN} < 26.5 \tag{4}$$

Here L is the diagonal length of a (substantially rectangular) effective image pickup area of an image pickup device, $R_{2FC}$ is the axial radius of curvature of a cementing surface in the object side-lens component in the second lens group, $n_{2FP}$ and $n_{2FN}$ are the d-line refractive indices of the positive and negative lens elements of the object side-lens component in the second lens group, respectively, and $V_{2FN}$ is the d-line based Abbe number of the negative lens element of the object side-lens component in the second lens group.

Condition (2) provides a definition of correction of longitudinal chromatic aberration and chromatic aberration of magnification. Exceeding the upper limit of 0.8 to this condition may make it easy to increase the thickness of the cemented lens component in the second lens group, but renders correction of the longitudinal chromatic aberration difficult. Falling short of the lower limit of 0 may be favorable for correction of the longitudinal chromatic aberration, but offers an obstacle to diminishing the thickness of the zoom lens upon received in a collapsible lens mount because there is no option but to make the cemented lens component thick.

Condition (3) defines a difference in the index of refraction of the medium between the positive and the negative lens element of the object side-lens component in the second lens group. Falling short of the lower limit of 0.01 may be effective for reducing the relative decentration sensitivity between the two lens components in the second lens group, but renders general correction of coma and so on difficult. Exceeding the upper limit of 0.2 may be favorable for correction of aberrations all over the zooming range, but is unfavorable for improvements in the relative decentration sensitivity between the two lens components in the second lens group.

Condition (4) provides a definition of correction of longitudinal chromatic aberration and chromatic aberration of magnification. Exceeding the upper limit of 26.5 incurs under-correction of the longitudinal chromatic aberration. Although there is no particular lower limit to $V_{2FN}$ because of the absence of any practically suitable medium, a prima facie lower limit thereto may be 20. A glass material less than the lower limit of 20 costs much.

More preferably, at least one or all of the following conditions (2)', (3)' and (4)' should be satisfied.

$$0.05 < L/R_{2FC} < 0.75 \tag{2}'$$

$$0.02 < n_{2FN} - n_{2FP} < 0.18 \tag{3}'$$

$$v_{2FN} < 26 \tag{4}'$$

Even more preferably, at least one of the following conditions (2)", (3)" and (4)" should be satisfied.

$$0.1 < L/R_{2FC} < 0.7 \tag{2}"$$

$$0.03 < n_{2FN} - n_{2FP} < 0.16 \tag{3}"$$

$$v_{2FN} < 25.5 \tag{4}"$$

Most preferably, all conditions (2)", (3)" and (4)" should be satisfied.

When the object side-lens component is defined by a cemented lens component consisting of a positive lens element and a negative lens component and the image side-lens component is composed of a positive single lens component, it is preferable to satisfy condition (5) with respect to the positive lens element located nearest to the image side of the second lens group.

$$-1.0 < (R_{2RF} + R_{2RR})/(R_{2RF} - R_{2RR}) < 0.6 \tag{5}$$

Here $R_{2RF}$ and $R_{2RR}$ are the axial radii of curvature of the object side-surface and the image side-surface of the image side-lens component in the second lens group, respectively.

An aspheric surface is introduced to the air contact surface side of the (cemented) positive lens element in the second lens group, thereby decreasing the F-number. Nonetheless, as the lower limit of −1.0 to condition (5) is not reached, spherical aberrations are likely to occur. As the upper limit of 0.6 is exceeded, astigmatism cannot fully be corrected even with the introduction of the aspheric surface into the first lens group.

More preferably, $$-0.7 < (R_{2RF} + R_{2RR})/(R_{2RF} - R_{2RR}) < 0.34 \tag{5}'$$

Even more preferably, $$0.025 < (R_{2RF} + R_{2RR})/(R_{2RF} - R_{2RR}) < 0.34 \tag{5}"$$

A total of two aspheric lenses should preferably be used for correction of aberrations throughout the zoom lens; one in the first lens group (for the purpose of correction of distortion, astigmatism and coma) and one in the second lens group (for the purpose of correction of spherical aberrations). The use of three or more aspheric lenses is less effective, only to cost much.

To reduce fluctuations of off-axis aberrations upon zooming from the wide-angle end to the telephoto end, the third lens group should preferably move in a convex locus toward the image side of the zoom lens.

In consideration of correction of spherical aberrations, condition (6) should preferably be satisfied in addition to condition (5).

$$5 < (R_{2FF} + R_{2FR})/(R_{2FF} - R_{2FR}) < 60 \tag{6}$$

Here $R_{2FF}$ is the axial radius of curvature of the surface located nearest to the object side of the object side-lens component in the second lens group, and $R_{2FR}$ is the axial radius of curvature of the surface located nearest to the image side of the object side-lens component in the second lens group.

As the upper limit of 60 to condition (6) is exceeded, spherical aberrations tend to remain under-corrected and lens thickness tends to increase. In addition, the processability of the positive lens in the object side-lens component becomes worse. As the lower limit of 5 is not reached, higher-order spherical aberrations rather occur and the processability of a deep concave surface on the negative lens side becomes worse.

More preferably, $$7 < (R_{2FF} + R_{2FR})/(R_{2FF} - R_{2FR}) < 60 \tag{6}'$$

Even more preferably, $$8 < (R_{2FF} + R_{2FR})/(R_{2FF} - R_{2FR}) < 60 \tag{6}"$$

Satisfaction of conditions (7) and (8) in addition to condition (5) is favorable for an exit pupil position, i.e., shading.

$$0.1 < f_{2R}/f_{3O} < 1.2 \tag{7}$$

$$0.01 < d_{2FR} \times R_{2FR}/t_2^2 < 0.6 \tag{8}$$

Here $f_{2R}$ is the focal length of the image side-lens component in the second lens group, $f_{3O}$ is the focal length of the third lens group, $d_{2FR}$ is the spacing between the image side-surface of the object side-lens component and the object side-surface of the image side-lens component in the second lens group, $R_{2FR}$ is the axial radius of curvature of the image side-surface of the object side-lens component in the second lens group, and $t_2$ is the axial distance of the second lens group from the surface located nearest to the object side thereof to the surface located nearest to the image side thereof.

Exceeding the upper limit of 1.2 to condition (7) may be favorable for the exit pupil position at the wide-angle end, i.e., shading, but causes the amount of fluctuations of the exit pupil position with zooming to the telephoto end to become unacceptably large for shading at the telephoto end. As the lower limit of 0.1 is not reached, the exit pupil comes too close to the wide-angle end, often resulting in shading, and the amount of movement of the third lens group for focusing becomes too large, leading to the need of an excessive space. In addition, the principal point position of the second lens group moves back due to the need of giving strength to the positive lens located on the image side of the second lens group where axial paraxial rays are at high positions. Consequently, any high magnification is hardly obtainable and the first lens group tends to become huge.

Falling short of the lower limit of 0.01 to condition (8) is not only unfavorable for correction of astigmatism but is also prone to incur shading by reason of the exit pupil position at the wide-angle end. Exceeding the upper limit of 0.6 offers an obstacle to reducing the thickness of the zoom lens upon received in a collapsible lens mount because the thickness of the second lens group increases.

More preferably, $$0.15 < f_{2R}/f_{3O} < 1.0 \tag{7}'$$

$$0.03 < d_{2FR} \times R_{2FR}/t_2^2 < 0.3 \tag{8}'$$

Even more preferably, $$0.3 < f_{2R}/f_{3O} < 0.8 \tag{7}"$$

$$0.05 < d_{2FR} \times R_{2FR}/t_2^2 < 0.21 \tag{8}"$$

Apart from these conditions, satisfaction of condition (9) in addition to condition (5) or (6) should be preferable for reducing the size of the zoom lens upon received in a collapsible lens mount.

$$0.2 < R_{2FC}/f_{2F} < 2 \tag{9}$$

Here $R_{2FC}$ is the radius of curvature of the cementing surface in the object side-lens component in the second lens group, and $f_{2F}$ is the focal length of the object side-lens component in the second lens group.

As the lower limit of 0.2 to condition (9) is not reached, it is easy to make the object side-lens component in the second lens group thin; however, it is difficult to make correction of longitudinal chromatic aberration. Exceeding the upper limit of 2 may be favorable for correction of the longitudinal chromatic aberration, but offers an obstacle to reducing the thickness of the zoom lens upon received in a collapsible lens mount because there is no option but to increase the thickness of the object side-lens component.

More preferably, $$0.3 < R_{2FC}/f_{2F} < 1.6 \tag{9}'$$

Even more preferably, $$0.4 < R_{2FC}/f_{2F} < 1.2 \tag{9}''$$

Preferably for size reductions of the zoom lens upon received in a collapsible lens mount, any one or two or more of conditions (a), (b) and (c) should be satisfied in addition to condition (5) or (6) or (9).

$$0.0 < f_2/f_{2R} < 1.3 \tag{a}$$

$$0.04 < t_{2N}/t_2 < 0.2 \tag{b}$$

$$0.5 < t_2/L < 1.2 \tag{c}$$

Here $f_2$ is the composite focal length of the second lens group, $f_{2R}$ is the focal length of the image side-lens component in the second lens group, $t_{2N}$ is the axial distance of the second lens group from the image side-surface of the cemented positive lens element of the object side-lens component to the image side-surface of the negative lens element thereof, $t_2$ is the axial distance of the second lens group from the surface located nearest to the object side thereof to the surface located nearest to the image side thereof, and L is the diagonal length of a (substantially rectangular) image pickup area of an image pickup device.

Condition (a) defines the ratio between the focal length of the positive lens element on the image side of the second lens group and the composite focal length of the second lens group. As the upper limit of 1.3 to that condition is exceeded, the magnification of the second lens group cannot be made high because the principal point of the second lens group comes close to the image side of the zoom lens. This in turn may cause the amount of movement, and the size, of the first lens group to become large, or bring about a dead space in the rear of the second lens group when the zoom lens is used, resulting in an increase in the length of the zoom lens or rendering complicated, huge or thick the mechanical structure of the lens barrel for reducing the thickness of the zoom lens upon received in a collapsible lens mount. As the lower limit of 0.0 is not reached, correction of astigmatism becomes difficult.

Condition (b) defines the axial distance $t_{2N}$ of the second lens group from the image side-surface of the cemented positive lens element of the object side-lens component in the second lens group to the image side-surface of the negative lens element thereof. Unless this part has a certain thickness, full correction of astigmatism is unachievable; however, it offers an obstacle to reducing the thickness of each element in the optical system. For this reason, the astigmatism is corrected by the introduction of an aspheric surface to any surface in the first lens group. Nonetheless, as the lower limit of 0.04 is not reached, the astigmatism cannot fully be corrected. As the upper limit of 0.2 is exceeded, thickness increases unacceptably.

More preferably, any one of the following conditions (a)', (b)' and (c)' should be satisfied, or two or three thereof should simultaneously be satisfied.

$$0.5 < f_2/f_{2R} < 1.2 \tag{a}'$$

$$0.06 < t_{2N}/t_2 < 0.18 \tag{b}'$$

$$0.55 < t_2/L < 1.1 \tag{c}'$$

Even more preferably, any one of the following conditions (a)", (b)" and (c)" should be satisfied, or two or three thereof should simultaneously be satisfied.

$$0.9 < f_2/f_{2R} < 1.1 \tag{a}''$$

$$0.08 < t_{2N}/t_2 < 0.16 \tag{b}''$$

$$0.6 < t_2/L < 1.0 \tag{c}''$$

At a zoom ratio of 2.3 or greater, satisfaction of conditions (d) and (e) makes some contribution to size reductions.

$$1.2 < -\beta_{2t} < 2.0 \tag{d}$$

$$1.6 < f_2/f_W < 3.0 \tag{e}$$

Here $\beta_{2t}$ is the magnification of the second lens group at the telephoto end (upon focused at an infinite object point), $f_2$ is the focal length of the second lens group, and $f_W$ is the focal length of the zoom lens at the wide-end angle (upon focused on an infinite object point).

Condition (d) defines the magnification $\beta_{2t}$ of the second lens group at the telephoto end (when the zoom lens is focused on an infinite object point). The absolute value of that magnification should preferably be as small as possible because an entrance pupil position at the wide-angle end is so shallow that the diameter and, hence, the thickness of the first lens group can be reduced. As the lower limit of 1.2 is not reached, it is difficult to satisfy thickness, and as the upper limit of 2.0 is exceeded, it is difficult to make correction for aberrations (spherical aberrations, coma and astigmatism).

Condition (e) defines the focal length $f_2$ of the second lens group. That focal length should preferably be short to slim down the second lens group itself; however, too short a focal length is not preferable for correction of aberrations, because there is going to an unreasonable power profile where, for instance, the rear principal point of the first lens group is positioned on the image side of the zoom lens. As the lower limit of 1.6 is not reached, it is difficult to make correction for spherical aberrations, coma, astigmatism and so on, and as the upper limit of 3.0 is exceeded, size reductions are little achievable.

More preferably, the following conditions (d)' and/or (e)" should be satisfied.

$$1.25 < -\beta_{2t} < 1.9 \tag{d}'$$

$$1.8 < f_2/f_W < 2.7 \tag{e}'$$

Even more preferably, the following conditions (d)" and/or (e)" should be satisfied.

$$1.3 < -\beta_{2t} < 1.8 \tag{d}''$$

$$2.0 < f_2/f_W < 2.5 \tag{e}''$$

As already noted, size reductions are contradictory to correction of aberrations. It is thus preferable to introduce an aspheric surface to the positive lens located nearest to the object side of the second lens group. This is effective for correction of spherical aberrations and coma and, accordingly, correction of astigmatism and longitudinal chromatic aberration can favorably be made.

As already described, it is preferable that when rear focusing is carried out at the third lens group, correction of off-axis aberrations throughout the zooming range is substantially finished at the first lens group and the second lens group. This is achievable by determination of what type of lens arrangement is selected for the first lens group in view of the second lens group, as described below. The first type lens arrangement for the first lens group is composed of, in order from its object side, a negative lens subgroup comprising up to two negative lenses and a positive lens subgroup consisting of one single lens having positive refracting power, wherein at least one negative lens in the negative lens subgroup includes an aspheric surface and conditions (f) and (g), given below, are satisfied.

$$-0.03 < f_W/R_{11} < 0.4 \tag{f}$$

$$0.15 < d_{NP}/f_W/1.0 \tag{g}$$

Here $R_{11}$ is the axial radius of curvature of the first lens surface as counted from the object side of the first lens group, $d_{NP}$ is an axial air separation between the negative lens subgroup and the positive lens subgroup, and $f_W$ is the focal length of the zoom lens at the wide-angle end (upon focused on an infinite object point).

Condition (f) defines the radius of curvature of the first lens surface in the aforesaid first lens arrangement for the first lens group. Preferably, distortion is corrected by the aspheric surface introduced into the first lens group, and astigmatism is corrected by the remaining spherical component. Exceeding the upper limit of 0.4 is unfavorable for correction of astigmatism, and as the lower limit of −0.03 is not reached, full correction of distortion is unachievable even at the aspheric surface.

Condition (g) defines the axial air separation $d_{NP}$ between the negative lens subgroup and the positive lens subgroup in the first type lens arrangement for the first lens group. Exceeding the upper limit of 1.0 may be favorable for correction of astigmatism, but causes the thickness of the first lens group to increase, contradictory to size reductions. As the lower limit of 0.15 is not reached, correction of astigmatism becomes difficult.

More preferably, the following conditions (f)' and/or (g)' be satisfied.

$$-0.02 < f_W/R_{11} < 0.24 \tag{f'}$$

$$0.18 < d_{NP}/f_W/0.7 \tag{g'}$$

Even more preferably, the following conditions (f)" and/or (g)" be satisfied.

$$-0.01 < f_W/R_{11} < 0.16 \tag{f"}$$

$$0.2 < d_{NP}/f_W/0.5 \tag{g"}$$

On the other hand, when the first lens group is composed of, in order from its object side, two negative meniscus lenses each convex on its object side and one positive lens, the introduction of an aspheric surface to any surface facing the air separation (the quantity of which is $d_{NN}$ as measured along the optical axis) between the two negative meniscus lenses is favorable for correction of distortion, astigmatism and coma. In view of the principal point position, it is further preferable satisfy conditions (h) and (i).

$$0.4 < R_{12}/R_{13} < 1.3 \tag{h}$$

$$0.02 < d_{NN}/f_W < 0.25 \tag{i}$$

Here $R_{12}$ is the axial radius of curvature of the image side-surface of the first negative meniscus lens as counted from the object side of the zoom lens and $R_{13}$ is the axial radius of curvature of the object side-surface of the second negative meniscus lens; condition (h) defines the $R_{12}$-to-$R_{13}$ ratio. As the lower limit of 0.4 is not reached, there is no option but to increase $d_{NN}$ because distortion is prone to become worse and for the reason of lens interferences. Exceeding the upper limit of 1.3 is not only unfavorable for correction of astigmatism but also renders it difficult to configure the second negative meniscus lens.

The value of condition (i) should preferably be reduced as much as possible so long as lens interferences are permissible. As the upper limit of 0.25 is exceeded, however, correction of astigmatism becomes difficult because of the need of unreasonably diminishing $d_{NP}$.

More preferably, the following conditions (h)' and/or (i)' should be satisfied.

$$0.47 < R_{12}/R_{13} < 1.0 \tag{h'}$$

$$0.02 < d_{NN}/f_W < 0.2 \tag{i'}$$

Even more preferably, the following conditions (h)" and/or (i)" should be satisfied.

$$0.5 < R_{12}/R_{13} < 0.8 \tag{h"}$$

$$0.02 < d_{NN}/f_W < 0.17 \tag{i"}$$

Alternatively, when the first lens group is composed of, in order from its object side, one negative meniscus lens convex on its object side and one positive lens, it is preferable to satisfy conditions (j) and (k) with respect to the first lens group.

$$-5.0 < (R_{1P1} + R_{1P2})/(R_{1P1} - R_{1P2}) < -1.3 \tag{j}$$

$$1.7 < n_{d1N} < 1.95 \tag{k}$$

Here $R_{1P1}$ and $R_{1P2}$ are the axial radii of curvature of the object and image sides of the positive lens component in the first lens group, respectively, and $n_{d1N}$ is the d-line refractive index of the negative meniscus lens in the first lens group.

Condition (j) defines the shape factor of the positive lens in the first lens group. Being less than the lower limit of −5.0 is not only unfavorable for correction of astigmatism but also requires an extra spacing between the first lens group and the second lens group to avoid mechanical interferences during zooming. As the upper limit of −1.3 is exceeded, correction of distortion tends to suffer inconvenience.

Condition (k) defines the refractive index of the medium of the negative lens in the first lens group. To ensure the strong negative power of the first lens group with one lens alone, $R_{11}$ must have a negative, strong curvature. Even when an aspheric surface is introduced to this lens, correction of distortion becomes insufficient. Consequently, the refractive index of the medium should preferably be made as high as possible. As the lower limit of 1.7 is not reached, distortion tends to occur. The prima facie upper limit of 1.95 is set because of the absence of any practical glass material exceeding that, inclusive of chromatic aberrations (Abbe number).

More preferably, the following conditions (j)' and/or (k)' should be satisfied.

$$-5.0 < (R_{1P1}+R_{1P2})/(R_{1P1}-R_{1P2}) < -1.7 \quad (j)'$$

$$1.72 < n_{d1N} < 1.95 \quad (k)'$$

Even more preferably, the following conditions (j)'' and/or (k)'' should be satisfied.

$$-5.0 < (R_{1P1}+R_{1P2})/(R_{1P1}-R_{1P2}) < -2.0 \quad (j)''$$

$$1.74 < n_{d1N} < 1.95 \quad (k)''$$

The second type lens arrangement for the first lens group is composed of, in order from its object side, a single lens including one aspheric surface and having weak refracting power, one negative single lens and one positive single lens, and satisfies condition (1).

$$-0.2 < f_W/f_{1*} < 0.3 \quad (1)$$

Here $f_{1*}$ is the focal length of the lens in the first lens group, which includes an aspheric surface and has weak refracting power, and $f_W$ is the focal length of the zoom lens at the wide-angle end (upon focused on an infinite object point).

Condition (1) defines the focal length $f_{1*}$ of the lens including an aspheric surface and having weak refracting power in the second type lens arrangement for the first lens group. As the upper limit of 0.3 is exceeded, the power of the negative lens in the first lens group becomes too strong and distortion tends to become worse, and the negative lens is difficult to process because of too small a radius of curvature of its concave surface. Falling short of the lower limit of −0.2 is not preferable for correction of astigmatism because the aspheric surface then works primarily for correction of distortion.

More preferably, $$-0.15 < f_W/f_{1*} < 0.2 \quad (1)'$$

Even more preferably, $$-0.1 < f_W/f_{1*} < 0.1 \quad (1)''$$

The third lens group should be composed of one positive single lens both surfaces of which are formed of substantially spherical surfaces, preferably with satisfaction of condition (m).

$$-1 < (R_{31}+R_{32})/(R_{31}-R_{32}) < 1 \quad (m)$$

Here $R_{31}$ and $R_{32}$ are the radii of curvature of the object and image sides of the positive lens that forms the third lens group, respectively. As the upper limit of 1 to condition (m) is exceeded, fluctuations of astigmatism with rear focusing become too large and so astigmatism is likely to become worse with respect to a nearby object point, although astigmatism at an infinite object point may be well corrected. As the lower limit of −1 is not reached, the fluctuations of astigmatism with rear focusing are reduced, but correction of aberrations with respect to an infinite object point becomes difficult.

More preferably, $$-0.45 < (R_{31}+R_{32})/(R_{31}-R_{32}) < 0.5 \quad (m)'$$

Even more preferably, $$-0.25 < (R_{31}+R_{32})/(R_{31}-R_{32}) < 0.5 \quad (m)''$$

To make the first and the second lens group thin while optimizing aberrations and paraxial quantity, the thickness of one lens group should preferably be reconciled with that of another lens group, as defined by conditions (n) and (o).

$$0.5 < t_2/t_1 < 1.5 \quad (n)$$

$$0.4 < t_1/L < 1.3 \quad (o)$$

Here $t_1$ is the axial distance of the first lens group from the lens surface located nearest to the object side thereof to the lens surface located nearest to the image side thereof, $t_2$ is the axial distance of the second lens group from the lens surface located nearest to the object side thereof to the lens surface located nearest to the image side thereof, and L is the diagonal length of the (substantially rectangular) effective image pickup area of the image pickup device.

Condition (n) defines the thickness ratio between the first and the second lens group. Increasing any surface-to-surface spacing in each lens group may be effective for correction of off-axis aberrations, especially astigmatism; however, this is not acceptable for thickness reductions. It is the second lens group that is less susceptible to deterioration in off-axis aberrations with the effect of the aspheric surface, even when each surface-to-surface spacing in the lens group is reduced. In other words, the smaller the value of condition (n), the better the balance becomes. As the upper limit of 1.5 is exceeded, correction of off-axis aberrations such as astigmatism becomes insufficient with a decreasing thickness of each lens group. As the lower limit of 0.5 is not reached, the second lens group cannot physically be set up or, rather, the first lens group becomes thick.

Condition (o) defines the total thickness of the first lens group. Exceeding the upper limit of 1.3 offers an obstacle to thickness reductions, and as the lower limit of 0.4 is not reached, the radius of curvature of each lens surface must be slacked and so it is difficult to put paraxial relations in order and make correction for various aberrations.

More preferably, $$0.6 < t_2/t_1 < 1.4 \quad (n)'$$

Even more preferably, $$0.7 < t_2/t_1 < 1.3 \quad (n)''$$

To ensure an edge thickness and a mechanical space, it necessary to vary the more proper range for condition (o) with the value of L, as given by condition (o)'.

$$0.6 < t_1/L < 1.3 \text{ provided that } L \cdot f_W < 6.2$$

$$0.5 < t_1/L < 1.2 \text{ provided that } 6.2 < L \cdot f_W < 9.2$$

$$0.4 < t_1/L < 1.1 \text{ provided that } 9.2 < L \cdot f_W$$

Desirously, the zoom lens of the present invention, wherein off-axis chief rays can be directed substantially vertically to the image plane, is used with an electronic imaging system comprising an electronic image pickup device located on the image plane side of the zoom lens.

To make a sensible tradeoff between good image quality and size reductions, it is desired that the diagonal length L of the effective image pickup area of the image pickup device be in the range of 3.0 mm to 12.0 mm inclusive. As the lower limit of 3.0 mm is not reached or the size of the image pickup device becomes too small, it is difficult to cover a shortfall in sensitivity. As the upper limit of 12.0 mm is exceeded or the size of the image pickup device becomes too large, the size of the zoom lens tends to become large incidentally; the effect of the present invention on slimming-down becomes slender. While, in Examples 1 through 7 given later, the focal length at the wide-angle end is standardized at 1, it is preferable that the diagonal length of the effective image pickup area of the image pickup device is properly determined as shown in Example 8.

The zoom lens of the present invention is favorable for setting up an electronic imaging system including a wide-angle area. In particular, the present zoom lens is preferable for use on an electronic imaging system wherein the diagonal half angle of view, $\omega_w$, at the wide-angle end satisfies the following condition (this diagonal half angle of view is tantamount to the wide-angle-end half angle of view $\omega_W$ referred to in the examples given later):

$$27°<\omega_W<42°$$

Being less than the lower limit of 27° to this condition or the wide-angle-end half angle of view becoming narrow is advantageous for correction of aberrations; however, this wide-angle-end half angle is no longer practical. As the upper limit of 42° is exceeded, on the other hand, distortion and chromatic aberration of magnification tend to occur and the number of lens elements increases.

Thus, the present invention provides means for improving the image-formation capability of the zoom lens part while diminishing the thickness the zoom lens part upon received in a collapsible lens mount.

Next, how and why the thickness of filters is reduced is now explained. In an electronic image pickup system, an infrared absorption filter having a certain thickness is usually inserted between an image pickup device and the object side of a zoom lens, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance of at least 80% at 600 nm and a transmittance of up to 10% at 700 nm is introduced between the image pickup device in the rear of the zoom lens system and the object side of the system, the transmittance on the red side is relatively higher as compared with those of the absorption type, so that the tendency of bluish purple to turn into magenta—a defect of a CCD or other solid-state image pickup device having a complementary colors mosaic filter—is diminished by gain control and there can be obtained color reproduction comparable to that by a CCD or other solid-state image pickup device having a primary colors filter. On the other hand, a complementary colors filter is higher in substantial sensitivity and more favorable in resolution than a primary colors filter-inserted CCD due to its high transmitted light energy, and provides a great merit when used in combination with a small-size CCD. Regarding an optical low-pass filter that is another filter, too, its total thickness $t_{LPF}$ (mm) should preferably satisfy condition (p):

$$0.15<t_{LPF}/a<0.45 \text{ (mm)} \tag{p}$$

Here $a$ is the horizontal pixel pitch (in $\mu$m) of the image pickup device.

Reducing the thickness of the optical low-pass filter, too, is effective for making the thickness of the zoom lens upon received in a collapsible mount; however, this is generally not preferred because the moiré preventive effect becomes slender. On the other hand, as the pixel pitch becomes small, the contrast of frequency components greater than Nyquist threshold decreases under the influence of diffraction of an image-formation lens system and, consequently, the decrease in the moiré preventive effect is more or less acceptable. For instance, it is known that when three different filters having crystallographic axes in directions where upon projected onto the image plane, the azimuth angle is horizontal (=0°) and ±45° are used while they are put one upon another, some moiré preventive effect is obtainable. According to the specifications known to make the filter assembly thinnest, each filter is displaced by $a$ $\mu$m in the horizontal and by SORT(½)*a $\mu$m in the ±45° directions. Here SORT means a square root. The then filter thickness is approximately given by [1+2*SQRT(½)]*a/5.88 (mm).

This is the specification where the contrast is reduced down to zero at a frequency corresponding just to Nyquist threshold. At a thickness a few % to a few tens of % smaller than this, a little more contrast of the frequency corresponding to Nyquist threshold appears; however, this can be suppressed under the influence of the aforesaid diffraction. In other filter embodiments where two filters are placed one upon another or one single filter is used, too, it is preferable to meet condition (p). When the upper limit of 0.45 is exceeded, the optical low-pass filter becomes too thick, contrary to size reduction requirements. When the lower limit of 0.15 is not reached, moiré removal becomes insufficient. In this condition, $a$ should be 5 $\mu$m or less.

When $a$ is 4 $\mu$m or less or where the optical low-pass filter is more susceptible to diffraction, it is preferable that $$0.13<t_{LPF}/a<0.42 \text{ (mm)} \tag{p'}$$

When $a$ is equal to or greater than 4 $\mu$m, condition (p)' may be rewritten as (p)".

0.3<$t_{LPF}$/a<0.4 (mm) provided that three filters are placed one upon another and a<5 $\mu$m, 0.2<$t_{LPF}$/a<0.16 (mm) provided that two filters are placed one upon another and a<5 $\mu$m, and 0.1<$t_{LPF}$/a<0.16 (mm) provided that one filter is used and a<5 $\mu$m.

When $a$ is equal to or less than 4 $\mu$m, condition (p)' may be rewritten as (p)".

0.25<$t_{LPF}$/a<0.37 (mm) provided that three filters are placed one upon another and a<4 $\mu$m, 0.16<$t_{LPF}$/a<0.25 (mm) provided that two filters are placed one upon another and a<4 $\mu$m, and 0.08<$t_{LPF}$/a<0.14 (mm) provided that one filter is used and a<4 $\mu$m.

When an image pickup device having a small pixel pitch is used, there is degradation in image quality under the influence of diffraction effect by stop-down. In this case, the electronic image pickup system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by $a$ ($\mu$m)/F-number<0.4, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

Examples 1 to 8 of the zoom lens according to the present invention are now explained. Sectional lens configurations of Examples 1, 3, 7 and 8 at the wide-angle end (a), in an intermediate state (b) and at the telephoto end (c) upon focused on an object point at infinity are shown in FIGS. 1 through 4, and Examples 2 and 4–6 are not shown because of being similar to Example 1. In FIGS. 1 to 4, G1 represents a first lens group, G2 a second lens group, and G3 a third lens group. Capital F stands for a group of plane-parallel plates such as an optical low-pass filter and a cover glass for a CCD that is an electronic image pickup device, and I the image plane of CCD. The group F of plane-parallel plates is fixedly located between the third lens group G3 and the image plane I. In Example 7 (FIG. 3), and Example 8 (FIG. 4), the group F of plane-parallel plates is composed of, in order from its object side, an infrared cut absorption filter, an optical low-pass filter and a cover glass for CCD. Instead of the infrared cut absorption filter, it is acceptable to use a transparent plane plate with a near-infrared sharp cut coat applied on the entrance surface or a low-pass filter that is directly provided with a near-infrared sharp cut coat (Examples 1–6).

EXAMPLE 1

Figure 1A:
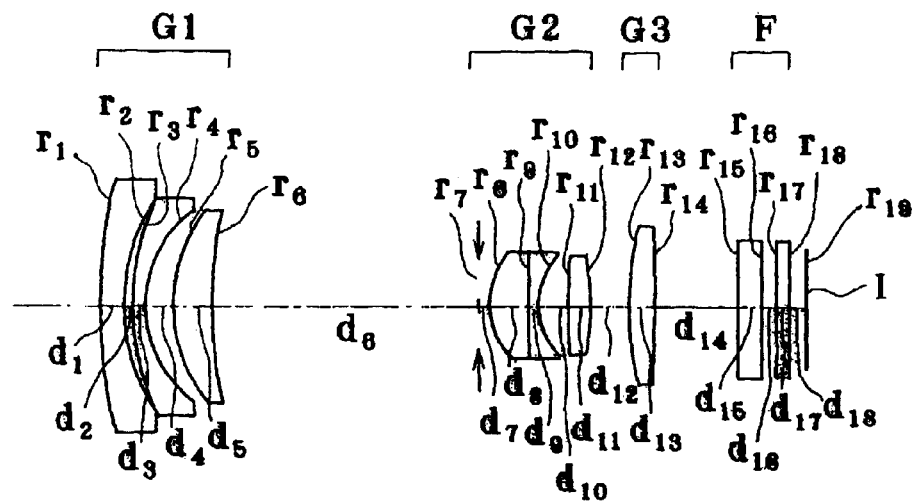
FIGS. 1(a), 1(b) and 1(c) are illustrative in section of Example 1 of the zoom lens at the wide-angle end (a), in an intermediate state (b) and at the telephoto end (c).
Figure 1B:
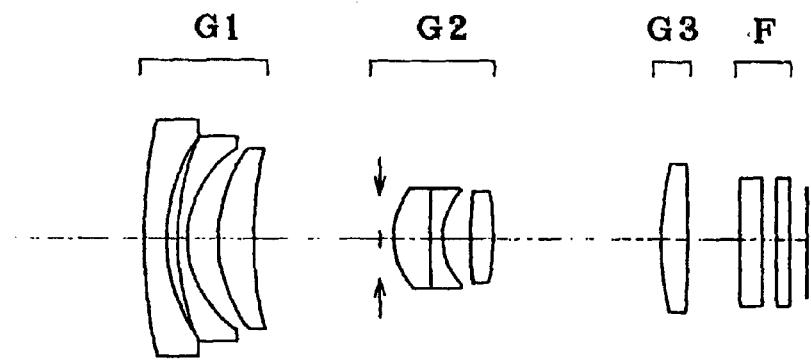
Figure 1C:
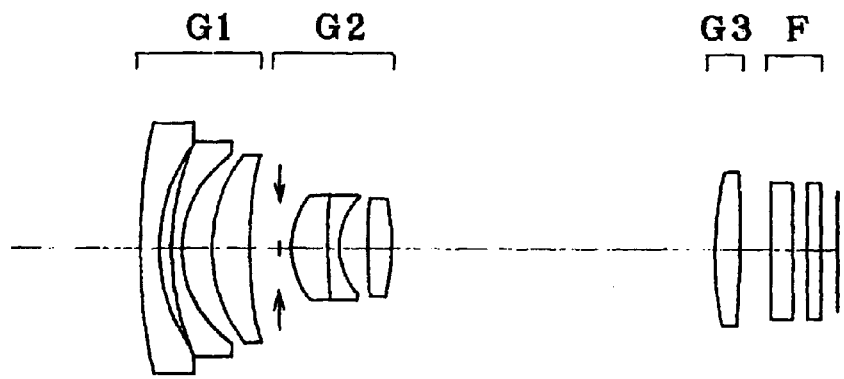

As shown in FIGS. 1(a), 1(b) and 1(c), Example 1 is directed to a zoom lens made up of a first lens group G1 having negative refracting power, a second lens group G2 having positive refracting power and a third lens group G3 having positive refracting power. For zooming from the wide-angle end to the telephoto end of the zoom lens upon focused on an infinite object point, the first lens group G1 moves toward the image plane side of the zoom lens and then goes back to the object side of the zoom lens, and arrives at the telephoto end where the first lens group G1 is located at much the same position as the wide-angle end, the second lens group G2 moves monotonously toward the object side while the spacing between the first lens group G1 and the second lens group G2 becomes narrow, and the third lens group G3 moves slightly toward the image plane side.

In Example 1, the first lens group G1 is composed of two negative meniscus lenses each convex on its object side and a positive meniscus lens convex on its object side, the second lens group G2 is composed of a stop, a doublet located in the rear thereof and composed of a doublet consisting of a positive meniscus lens convex on its object side and a negative meniscus lens convex on its object side and a double-convex lens, and the third lens group is composed of one double-convex lens. Two aspheric surfaces are used; one at the image plane side-surface of the negative meniscus lens located on the object side of the first lens group G1 and another at the object side-surface of the doublet in the second lens group G2.

EXAMPLE 2

As in Example 1, Example 2 is directed to a zoom lens made up of a first lens group G1 having negative refracting power, a second lens group G2 having positive refracting power and a third lens group G3 having positive refracting power. For zooming from the wide-angle end to the telephoto end of the zoom lens upon focused on an infinite object point, the first lens group G1 moves toward the image plane side of the zoom lens and then goes back to the object side of the zoom lens, and is located slightly nearer to the image plane side at the telephoto end than at the wide-angle end, the second lens group G2 moves monotonously toward the object side while the spacing between the first lens group G1 and the second lens group G2 becomes narrow, and the third lens group G3 moves slightly toward the image plane side.

The lens arrangements for the respective lens groups G1 to G3 are the same as in Example 1. Two aspheric surfaces are used; one at the object side-surface of the negative meniscus lens located on the image plane side of the first lens group G1 and another at the object side-surface of the doublet in the second lens group G2.

EXAMPLE 3

Figure 2A:
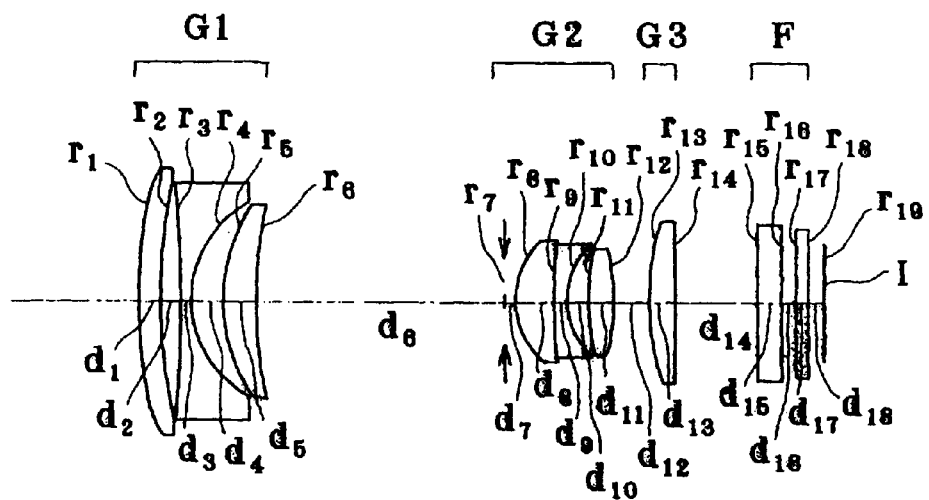
FIGS. 2(a), 2(b) and 2(c) are sectional views of Example 3 of the zoom lens, similar to FIGS. 1(a) to 1(c).
Figure 2B:
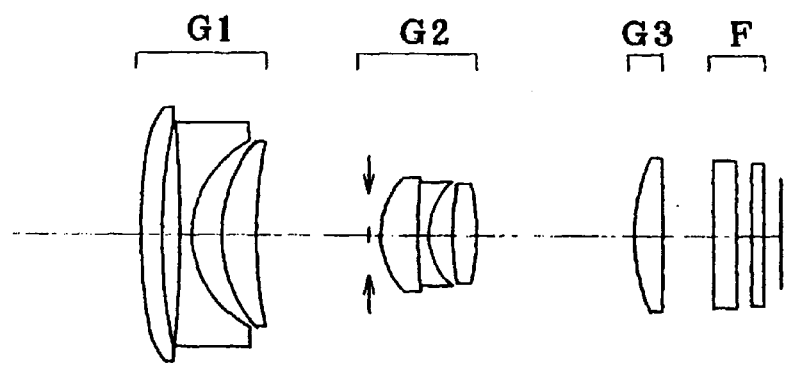
Figure 2C:
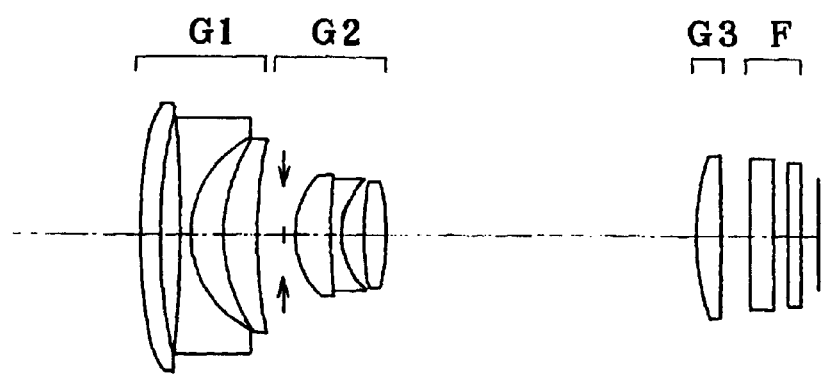

As shown in FIGS. 2(a), 2(b) and 2(c), Example 3 is directed to a zoom lens made up of a first lens group G1 having negative refracting power, a second lens group G2 having positive refracting power and a third lens group G3 having positive refracting power. For zooming from the wide-angle end to the telephoto end of the zoom lens upon focused on an infinite object point, the first lens group G1 moves toward the image plane side of the zoom lens and then goes back to the object side of the zoom lens, and is located slightly nearer to the image plane side at the telephoto end than at the wide-angle end, the second lens group G2 moves monotonously toward the object side while the spacing between the first lens group G1 and the second lens group G2 becomes narrow, and the third lens group G3 moves slightly toward the image plane side.

In Example 3, the first lens group G1 is composed of a negative meniscus lens convex on its object side, a double-concave negative lens and a positive meniscus lens convex on its object side, the second lens group G2 is composed of a stop, a doublet located in the rear thereof and consisting of a positive meniscus lens convex on its object side and a negative meniscus lens convex on its object side and a double-convex lens, and the third lens group G3 is made up of one double-convex lens. Two aspheric surfaces are used; one at the object side-surface of the negative meniscus lens in the first lens group G1 and another at the object side-surface of the doublet in the second lens group G2.

EXAMPLE 4

As in Example 1, Example 4 is directed to a zoom lens made up of a first lens group G1 having negative refracting power, a second lens group G2 having positive refracting power and a third lens group G3 having positive refracting power. For zooming from the wide-angle end to the telephoto end of the zoom lens upon focused on an infinite object point, the first lens group G1 moves toward the image plane side of the zoom lens and then goes back to the object side of the zoom lens, and arrives at the telephoto end where the first lens group G1 is located at much the same position as the wide-angle end, the second lens G2 moves monotonously toward the object side while the spacing between the first lens group G1 and the second lens group G2 becomes narrow, and the third lens group G3 moves slightly toward the image plane side.

The lens arrangements for the respective lens groups G1 to G3 are the same as in Example 1. Two aspheric surfaces are used; one at the object side-surface of the negative meniscus lens located on the image side of the first lens group G1 and another at the object side-surface of the doublet in the second lens group G2.

EXAMPLE 5 & EXAMPLE 6

As in Example 1, Examples 5 and 6 are each directed to a zoom lens made up of a first lens group G1 having negative refracting power, a second lens group G2 having positive refracting power and a third lens group G3 having positive refracting power. For zooming from the wide-angle end to the telephoto end of the zoom lens upon focused on an infinite object point, the first lens group G1 moves toward the image plane side of the zoom lens and then goes back to the object side of the zoom lens, and is located slightly nearer to the image plane side at the telephoto end than at the wide-angle end, the second lens G2 moves monotonously toward the object side while the spacing between the first lens group G1 and the second lens group G2 becomes narrow, and the third lens group G3 moves toward the image plane side and then slightly toward the object side.

The lens arrangements for the respective lens groups G1 to G3 are the same as in Example 1. Two aspheric surfaces are used; one at the object side-surface of the negative meniscus lens located on the image plane side of the first lens group G1 and another at the object side-surface of the doublet in the second lens group G2.

EXAMPLE 7

Figure 3A:
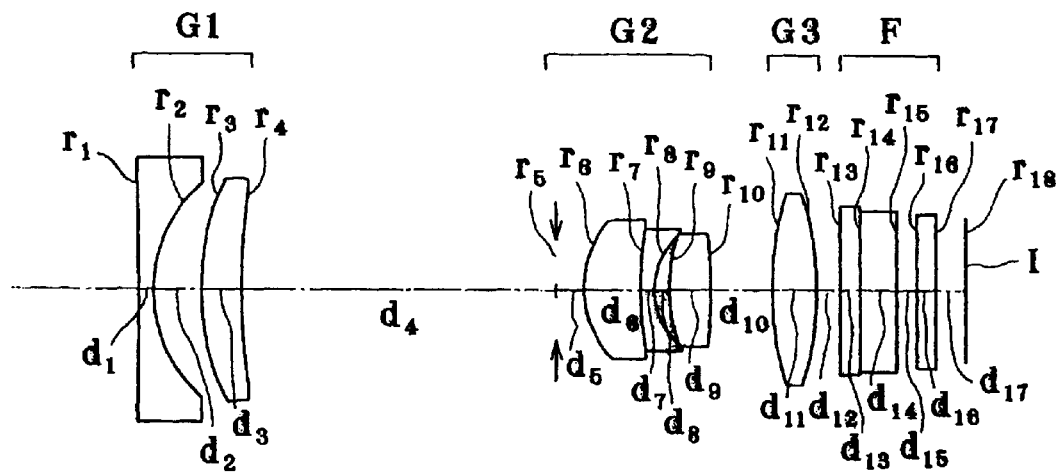
FIGS. 3(a), 3(b) and 3(c) are sectional views of Example 7 of the zoom lens, similar to FIGS. 1(a) to 1(c).
Figure 3B:
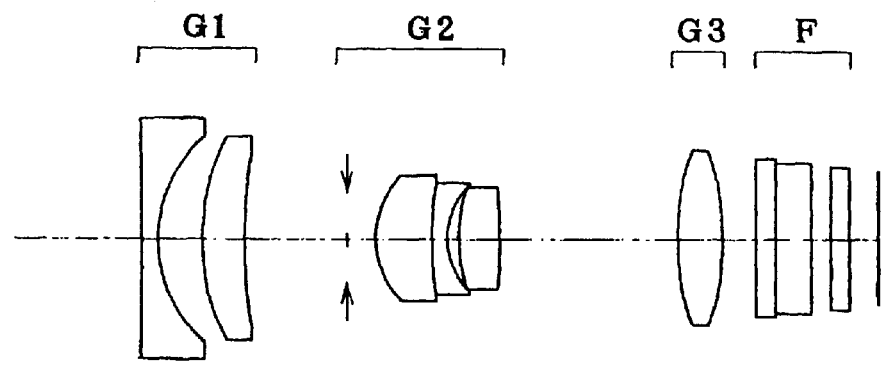
Figure 3C:
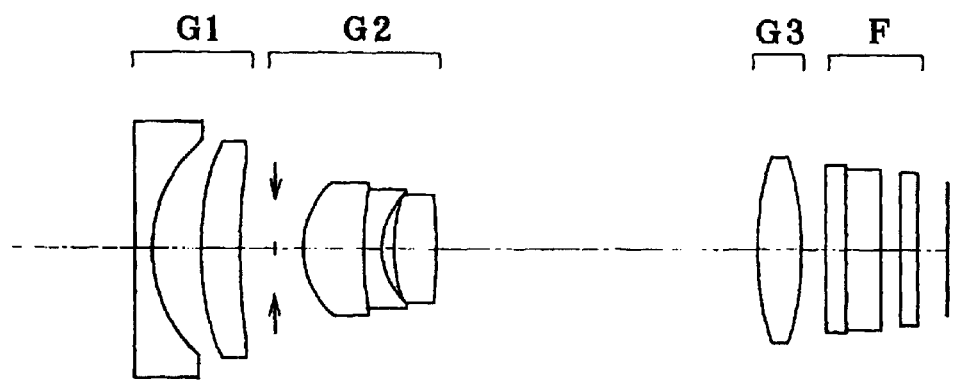

As shown in FIGS. 3(a), 3(b) and 3(c), Example 7 is directed to a zoom lens made up of a first lens group G1 having negative refracting power, a second lens group G2 having positive refracting power and a third lens group G3 having positive refracting power. For zooming from the wide-angle end to the telephoto end of the zoom lens upon focused on an infinite object point, the first lens group G1 moves toward the image plane side of the zoom lens and then goes back to the object side of the zoom lens, and is located slightly nearer to the image plane side at the telephoto end than at the wide-angle end, the second lens group G2 moves monotonously toward the object side while the spacing between the first lens group G1 and the second lens group G2 becomes narrow, and the third lens group G3 moves toward the object side and then slightly toward the image plane side.

In Example 7, the first lens group G1 is composed of a double-concave negative lens and a positive meniscus lens convex on its object side, the second lens group G2 is composed of a stop, a doublet located in the rear thereof and consisting of a positive meniscus lens convex on its object side and a negative meniscus lens convex on its object side and a double-convex lens, and the third lens group G3 is composed of one double-convex lens. Two aspheric surfaces are used; one at the image plane side-surface of the double-concave negative lens in the first lens group G1 and another at the object side-surface of the doublet in the second lens group G2.

EXAMPLE 8

Figure 4A:
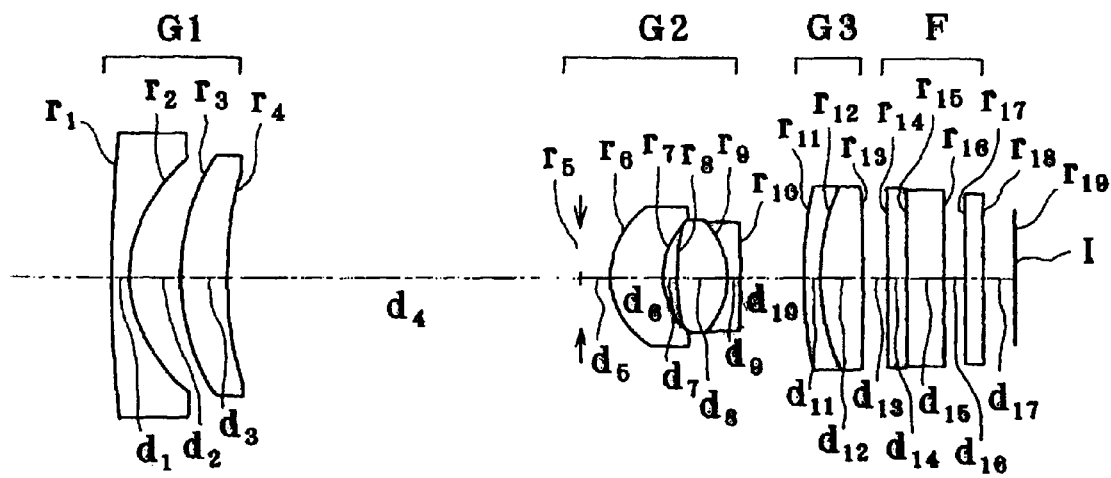
FIGS. 4(a), 4(b) and 4(c) are sectional views of Example 8 of the zoom lens, similar to FIGS. 1(a) to 1(c).
Figure 4B:
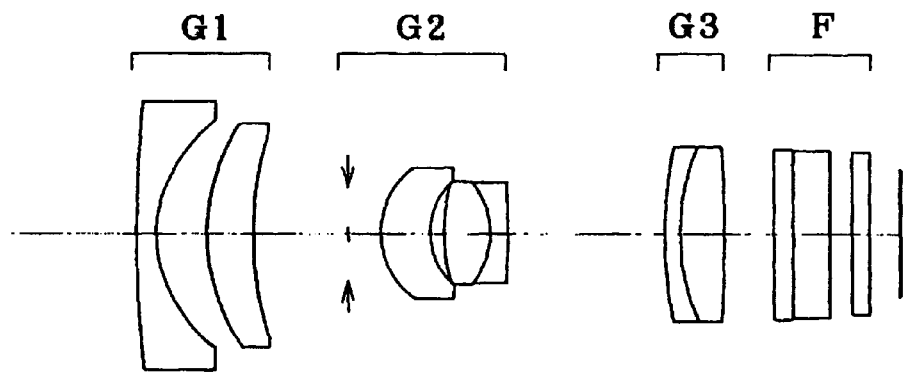
Figure 4C:
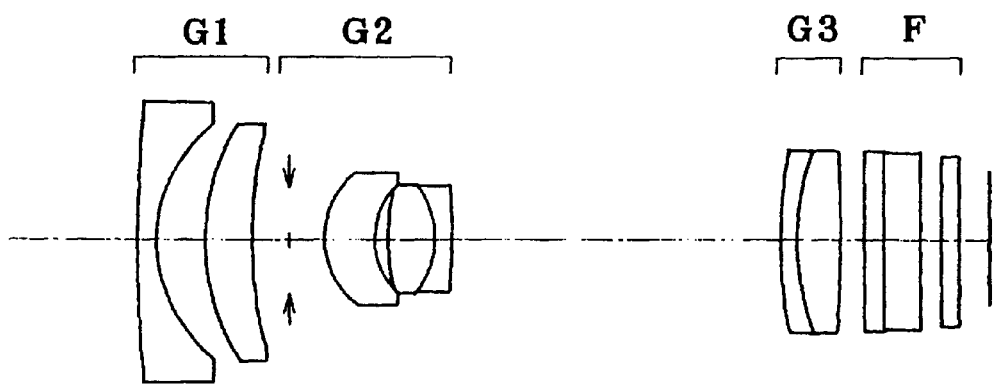

As shown in FIGS. 4(a), 4(b) and 4(c), Example 8 is directed to a zoom lens made up of a first lens group G1 having negative refracting power, a second lens group G2 having positive refracting power and a third lens group G3 having positive refracting power. For zooming from the wide-angle end to the telephoto end of the zoom lens upon focused on an infinite object point, the first lens group G1 moves toward the image plane side of the zoom lens and then goes back to the object side of the zoom lens, and is located slightly nearer to the image plane side at the telephoto end than at the wide-angle end, the second lens group G2 moves monotonously toward the object side while the spacing between the first lens group G1 and the second lens group G2 becomes narrow, and the third lens group G3 moves in a convex locus toward the image plane side, and is located slightly nearer to the object side at the telephoto end than at the wide-angle end.

In Example 8, the first lens group G1 is composed of a negative meniscus lens convex on its object side and a positive meniscus lens convex on its object side, the second lens group G2 is composed of a stop, a triplet located in the rear thereof and consisting of a positive meniscus lens convex on its object side, a double-convex positive lens and a negative meniscus lens convex on its image plane side, and the third lens group G3 is composed of a doublet consisting of a negative meniscus lens convex on its object side and a double-convex lens. Two aspheric surfaces are used; one at the image plane side-surface of the negative meniscus lens in the first lens group G1 and another at the object side-surface of the positive meniscus lens in the second lens group G2.

Numerical data on each example are enumerated below. Symbols used hereinafter but not hereinbefore have the following meanings:

f: focal length of the zoom lens
ω: half angle of view
$F_{NO}$: F-number
WE: wide-angle end
ST: intermediate state
TE: telephoto end
$r_1, r_2, \ldots$ : radius of curvature of each lens surface
$d_1, d_2, \ldots$ : spacing between adjacent lens surfaces
$n_{d1}, n_{d2}, \ldots$ : d-line refractive index of each lens
$V_{d1}, V_{d2}, \ldots$ : Abbe number of each lens Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4 y^4+A_6 y^6+A_8 y^8+A_{10} y^{10}$$

where r is a paraxial radius of curvature, K is a conical coefficient, and $A_4$, A6, $A_8$ and $A_{10}$ are the fourth, sixth, eighth and tenth aspheric coefficients, respectively.

EXAMPLE 1

$r_1 = 7.022$         $d_1 = 0.22$      $n_{d1} = 1.74320$   $v_{d1} = 49.34$
$r_2 = 1.616$ (Aspheric) $d_2 = 0.14$
$r_3 = 2.913$         $d_3 = 0.15$      $n_{d2} = 1.77250$   $v_{d2} = 49.60$
$r_4 = 1.304$         $d_4 = 0.33$
$r_5 = 1.814$         $d_5 = 0.43$      $n_{d3} = 1.84666$   $v_{d3} = 23.78$
$r_6 = 4.242$         $d_6 = D6$
$r_7 = \infty$ (Stop) $d_7 = 0.15$
$r_8 = 0.926$ (Aspheric) $d_8 = 0.40$   $n_{d4} = 1.80610$   $v_{d4} = 40.92$
$r_9 = 5.825$         $d_9 = 0.15$      $n_{d5} = 1.84666$   $v_{d5} = 23.78$
$r_{10} = 0.830$      $d_{10} = 0.31$
$r_{11} = 4.641$      $d_{11} = 0.28$   $n_{d6} = 1.72916$   $v_{d6} = 54.68$
$r_{12} = -2.815$     $d_{12} = D12$
$r_{13} = 3.532$      $d_{13} = 0.31$   $n_{d7} = 1.69680$   $v_{d7} = 55.53$
$r_{14} = -32.824$    $d_{14} = D14$
$r_{15} = \infty$     $d_{15} = 0.27$   $n_{d8} = 1.54771$   $v_{d8} = 62.84$
$r_{16} = \infty$     $d_{16} = 0.15$
$r_{17} = \infty$     $d_{17} = 0.15$   $n_{d9} = 1.51633$   $v_{d9} = 64.14$
$r_{18} = \infty$     $d_{18} = 0.19$
$r_{19} = \infty$ (Image Plane)

Aspherical Coefficients
2 nd Surface

K=0.000

$A_4=-4.00774\times10^{-2}$ $A_6=-6.32914\times10^{-3}$ $A_8=-8.21616\times10^{-3}$ $A_{10}=6.42064\times10^{-4}$ 8th Surface

K=0.000

$A_4=-6.45705\times10^{-2}$ $A_6=-1.92709\times10^{-2}$ $A_8=-1.10326\times10^{-1}$ $A_{10}=0$

|                        | WE    | ST    | TE    |
|------------------------|-------|-------|-------|
| Zooming Data (∞)       |       |       |       |
| f (mm)                 | 1.000 | 1.732 | 3.000 |
| $F_{NO}$               | 2.50  | 3.30  | 4.51  |
| ω (°)                  | 32.51 | 19.97 | 11.69 |
| D6                     | 3.03  | 1.43  | 0.34  |
| D12                    | 0.40  | 1.87  | 3.62  |
| D14                    | 0.88  | 0.56  | 0.34  |
| Zooming Data (Close-up)|       |       |       |
| D6                     | 3.03  | 1.43  | 0.34  |
| D12                    | 0.32  | 1.60  | 2.86  |
| D14                    | 0.96  | 0.84  | 1.09  |

EXAMPLE 2

$r_1 = 17.447$        $d_1 = 0.19$      $n_{d1} = 1.78590$   $v_{d1} = 44.20$
$r_2 = 1.843$         $d_2 = 0.11$
$r_3 = 3.105$ (Aspheric) $d_3 = 0.24$   $n_{d2} = 1.74320$   $v_{d2} = 49.34$
$r_4 = 1.330$         $d_4 = 0.28$
$r_5 = 1.814$         $d_5 = 0.51$      $n_{d3} = 1.80518$   $v_{d3} = 25.42$
$r_6 = 5.663$         $d_6 = D6$
$r_7 = \infty$ (Stop) $d_7 = 0.15$
$r_8 = 0.918$ (Aspheric) $d_8 = 0.40$   $n_{d4} = 1.80610$   $v_{d4} = 40.92$
$r_9 = 5.480$         $d_9 = 0.15$      $n_{d5} = 1.84666$   $v_{d5} = 23.78$
$r_{10} = 0.826$      $d_{10} = 0.22$
$r_{11} = 4.528$      $d_{11} = 0.21$   $n_{d6} = 1.69350$   $v_{d6} = 53.21$
$r_{12} = -2.567$     $d_{12} = D12$
$r_{13} = 4.061$      $d_{13} = 0.35$   $n_{d7} = 1.48749$   $v_{d7} = 70.23$
$r_{14} = -4.932$     $d_{14} = D14$
$r_{15} = \infty$     $d_{15} = 0.27$   $n_{d8} = 1.54771$   $v_{d8} = 62.84$
$r_{16} = \infty$     $d_{16} = 0.15$
$r_{17} = \infty$     $d_{17} = 0.15$   $n_{d9} = 1.51633$   $v_{d9} = 64.14$
$r_{18} = \infty$     $d_{18} = 0.19$
$r_{19} = \infty$ (Image Plane)

Aspherical Coefficients 3 rd Surface

K=0.000

$A_4=3.86501\times10^{-2}$ $A_6=-3.71941\times10^{-3}$ $A_8=8.72100\times10^{-3}$ $A_{10}=4.61180\times10^{-5}$ 8 th Surface

K=0.000

$A_4=-6.63342\times10^{-2}$ $A_6=-5.50821\times10^{-2}$ $A_8=-4.32431\times10^{-2}$ $A_{10}=0$

|  | WE | ST | TE |
|---|---|---|---|
| Zooming Data ($\infty$) | | | |
| f (mm) | 1.000 | 1.732 | 3.000 |
| $F_{NO}$ | 2.50 | 3.14 | 4.50 |
| $\omega$ (°) | 33.08 | 20.12 | 11.73 |
| D6 | 3.03 | 1.17 | 0.27 |
| D12 | 0.38 | 1.38 | 3.35 |
| D14 | 0.83 | 0.78 | 0.32 |
| Zooming Data (Close-up) | | | |
| D6 | 3.03 | 1.17 | 0.27 |
| D12 | 0.33 | 1.24 | 2.89 |
| D14 | 0.87 | 0.91 | 0.78 |

EXAMPLE 3

$r_1 = 14.219$ (Aspheric)  $d_1 = 0.24$  $n_{d1} = 1.74320$  $v_{d1} = 49.34$
$r_2 = 6.139$  $d_2 = 0.22$
$r_3 = -26.932$  $d_3 = 0.15$  $n_{d2} = 1.77250$  $v_{d2} = 49.60$
$r_4 = 1.259$  $d_4 = 0.37$
$r_5 = 1.956$  $d_5 = 0.39$  $n_{d3} = 1.84666$  $v_{d3} = 23.78$
$r_6 = 5.308$  $d_6 = D6$
$r_7 = \infty$ (Stop)  $d_7 = 0.15$
$r_8 = 0.963$ (Aspheric)  $d_8 = 0.42$  $n_{d4} = 1.80610$  $v_{d4} = 40.92$
$r_9 = 7.612$  $d_9 = 0.15$  $n_{d5} = 1.84666$  $v_{d5} = 23.78$
$r_{10} = 0.873$  $d_{10} = 0.25$
$r_{11} = 4.528$  $d_{11} = 0.27$  $n_{d6} = 1.69680$  $v_{d6} = 55.53$
$r_{12} = -2.502$  $d_{12} = D12$
$r_{13} = 3.409$  $d_{13} = 0.30$  $n_{d7} = 1.58913$  $v_{d7} = 61.14$
$r_{14} = -34.710$  $d_{14} = D14$
$r_{15} = \infty$  $d_{15} = 0.27$  $n_{d8} = 1.54771$  $v_{d8} = 62.84$
$r_{16} = \infty$  $d_{16} = 0.15$
$r_{17} = \infty$  $d_{17} = 0.15$  $n_{d9} = 1.51633$  $v_{d9} = 64.14$
$r_{18} = \infty$  $d_{18} = 0.19$
$r_{19} = \infty$ (Image Plane)

Aspherical Coefficients 1 st Surface

K=0.000
$A_4 = 2.93055 \times 10^{-2}$
$A_6 = -3.19778 \times 10^{-3}$
$A_8 = 2.11980 \times 10^{-3}$
$A_{10} = -5.70506 \times 10^{-5}$
8 th Surface
K=0.000
$A_4 = -6.25564 \times 10^{-2}$
$A_6 = -2.68400 \times 10^{-2}$
$A_8 = -6.50820 \times 10^{-2}$
$A_{10} = 0$

|  | WE | ST | TE |
|---|---|---|---|
| Zooming Data ($\infty$) | | | |
| f (mm) | 1.000 | 1.732 | 3.000 |
| $F_{NO}$ | 2.51 | 3.29 | 4.50 |
| $\omega$ (°) | 32.55 | 20.08 | 11.71 |
| D6 | 2.96 | 1.36 | 0.31 |
| D12 | 0.40 | 1.81 | 3.54 |
| D14 | 0.91 | 0.58 | 0.34 |
| Zooming Data (Close-up) | | | |
| D6 | 2.96 | 1.36 | 0.31 |
| D12 | 0.35 | 1.65 | 3.05 |
| D14 | 0.96 | 0.75 | 0.83 |

EXAMPLE 4

$r_1 = 8.732$  $d_1 = 0.14$  $n_{d1} = 1.79952$  $v_{d1} = 42.22$
$r_2 = 1.591$  $d_2 = 0.14$
$r_3 = 2.927$ (Aspheric)  $d_3 = 0.22$  $n_{d2} = 1.80610$  $v_{d2} = 40.92$
$r_4 = 1.218$  $d_4 = 0.23$
$r_5 = 1.615$  $d_5 = 0.38$  $n_{d3} = 1.84666$  $v_{d3} = 23.78$
$r_6 = 4.774$  $d_6 = D6$
$r_7 = \infty$ (Stop)  $d_7 = 0.14$
$r_8 = 0.932$ (Aspheric)  $d_8 = 0.48$  $n_{d4} = 1.80610$  $v_{d4} = 40.92$
$r_9 = 7.556$  $d_9 = 0.14$  $n_{d5} = 1.84666$  $v_{d5} = 23.78$
$r_{10} = 0.824$  $d_{10} = 0.18$
$r_{11} = 3.445$  $d_{11} = 0.24$  $n_{d6} = 1.72916$  $v_{d6} = 54.68$
$r_{12} = -2.680$  $d_{12} = D12$
$r_{13} = 5.006$  $d_{13} = 0.31$  $n_{d7} = 1.58913$  $v_{d7} = 61.14$
$r_{14} = -7.258$  $d_{14} = D14$
$r_{15} = \infty$  $d_{15} = 0.25$  $n_{d8} = 1.54771$  $v_{d8} = 62.84$
$r_{16} = \infty$  $d_{16} = 0.14$
$r_{17} = \infty$  $d_{17} = 0.14$  $n_{d9} = 1.51633$  $v_{d9} = 64.14$
$r_{18} = \infty$  $d_{18} = 0.17$
$r_{19} = \infty$ (Image Plane)

Aspherical Coefficients 3 rd Surface

K=0.000
$A_4 = 3.85367 \times 10^{-2}$
$A_6 = 1.14007 \times 10^{-2}$
$A_8 = -6.88670 \times 10^{-4}$
$A_{10} = 5.90038 \times 10^{-3}$
8th Surface
K=0.000
$A_4 = -6.72801 \times 10^{-2}$
$A_6 = -4.58387 \times 10^{-2}$
$A_8 = -7.41050 \times 10^{-2}$
$A_{10} = -2.20526 \times 10^{-18}$

|  | WE | ST | TE |
|---|---|---|---|
| Zooming Data ($\infty$) | | | |
| f (mm) | 1.000 | 1.733 | 3.000 |
| $F_{NO}$ | 2.50 | 3.31 | 4.50 |
| $\omega$ (°) | 30.79 | 18.50 | 10.79 |
| D6 | 2.70 | 1.28 | 0.29 |
| D12 | 0.42 | 1.76 | 3.27 |
| D14 | 0.81 | 0.46 | 0.31 |
| Zooming Data (Close-up) | | | |
| D6 | 2.70 | 1.28 | 0.29 |
| D12 | 0.36 | 1.56 | 2.72 |
| D14 | 0.87 | 0.65 | 0.86 |

EXAMPLE 5

| | | | |
|---|---|---|---|
| $r_1 = 7.848$ | $d_1 = 0.17$ | $n_{d1} = 1.77250$ | $\nu_{d1} = 49.60$ |
| $r_2 = 1.894$ | $d_2 = 0.08$ | | |
| $r_3 = 2.942$ (Aspheric) | $d_3 = 0.22$ | $n_{d2} = 1.80610$ | $\nu_{d2} = 40.74$ |
| $r_4 = 1.250$ | $d_4 = 0.34$ | | |
| $r_5 = 1.735$ | $d_5 = 0.35$ | $n_{d3} = 1.84666$ | $\nu_{d3} = 23.78$ |
| $r_6 = 3.718$ | $d_6 = D6$ | | |
| $r_7 = \infty$ (Stop) | $d_7 = 0.14$ | | |
| $r_8 = 0.881$ (Aspheric) | $d_8 = 0.39$ | $n_{d4} = 1.80610$ | $\nu_{d4} = 40.74$ |
| $r_9 = 3.976$ | $d_9 = 0.14$ | $n_{d5} = 1.84666$ | $\nu_{d5} = 23.78$ |
| $r_{10} = 0.784$ | $d_{10} = 0.14$ | | |
| $r_{11} = 3.751$ | $d_{11} = 0.27$ | $n_{d6} = 1.72916$ | $\nu_{d6} = 54.68$ |
| $r_{12} = -2.716$ | $d_{12} = D12$ | | |
| $r_{13} = 3.953$ | $d_{13} = 0.32$ | $n_{d7} = 1.48749$ | $\nu_{d7} = 70.23$ |
| $r_{14} = -5.192$ | $d_{14} = D14$ | | |
| $r_{15} = \infty$ | $d_{15} = 0.25$ | $n_{d8} = 1.54771$ | $\nu_{d8} = 62.84$ |
| $r_{16} = \infty$ | $d_{16} = 0.14$ | | |
| $r_{17} = \infty$ | $d_{17} = 0.14$ | $n_{d9} = 1.51633$ | $\nu_{d9} = 64.14$ |
| $r_{18} = \infty$ | $d_{18} = 0.17$ | | |
| $r_{19} = \infty$ (Image Plane) | | | |

Aspherical Coefficients
3 rd Surface
K=0.000
$A_4 = 2.50462 \times 10^{-2}$
$A_6 = 1.63662 \times 10^{-2}$
$A_8 = -1.06286 \times 10^{-2}$
$A_{10} = 6.52447 \times 10^{-3}$
8th Surface
K=0.000
$A_4 = -7.41926 \times 10^{-2}$
$A_6 = -3.23268 \times 10^{-2}$
$A_8 = -1.50837 \times 10^{-1}$
$A_{10} = 0$

| | WE | ST | TE |
|---|---|---|---|
| Zooming Data (∞) | | | |
| f (mm) | 1.000 | 1.733 | 3.000 |
| $F_{NO}$ | 2.55 | 3.42 | 4.50 |
| ω (°) | 30.75 | 18.49 | 10.80 |
| D6 | 2.96 | 1.49 | 0.28 |
| D12 | 0.54 | 1.95 | 3.18 |
| D14 | 0.70 | 0.26 | 0.31 |
| Zooming Data (Close-up) | | | |
| D6 | 2.96 | 1.49 | 0.28 |
| D12 | 0.49 | 1.74 | 2.67 |
| D14 | 0.76 | 0.47 | 0.82 |

EXAMPLE 6

| | | | |
|---|---|---|---|
| $r_1 = 9.732$ | $d_1 = 0.17$ | $n_{d1} = 1.77250$ | $\nu_{d1} = 49.60$ |
| $r_2 = 1.974$ | $d_2 = 0.09$ | | |
| $r_3 = 2.976$ (Aspheric) | $d_3 = 0.22$ | $n_{d2} = 1.80610$ | $\nu_{d2} = 40.74$ |
| $r_4 = 1.250$ | $d_4 = 0.33$ | | |
| $r_5 = 1.747$ | $d_5 = 0.36$ | $n_{d3} = 1.84666$ | $\nu_{d3} = 23.78$ |
| $r_6 = 3.910$ | $d_6 = D6$ | | |
| $r_7 = \infty$ (Stop) | $d_7 = 0.14$ | | |
| $r_8 = 0.878$ (Aspheric) | $d_8 = 0.39$ | $n_{d4} = 1.80610$ | $\nu_{d4} = 40.74$ |
| $r_9 = 4.472$ | $d_9 = 0.14$ | $n_{d5} = 1.84666$ | $\nu_{d5} = 23.78$ |
| $r_{10} = 0.784$ | $d_{10} = 0.14$ | | |
| $r_{11} = 4.127$ | $d_{11} = 0.26$ | $n_{d6} = 1.72916$ | $\nu_{d6} = 54.68$ |
| $r_{12} = -2.569$ | $d_{12} = D12$ | | |
| $r_{13} = 4.461$ | $d_{13} = 0.32$ | $n_{d7} = 1.48749$ | $\nu_{d7} = 70.23$ |
| $r_{14} = -4.461$ | $d_{14} = D14$ | | |
| $r_{15} = \infty$ | $d_{15} = 0.25$ | $n_{d8} = 1.54771$ | $\nu_{d8} = 62.84$ |
| $r_{16} = \infty$ | $d_{16} = 0.14$ | | |
| $r_{17} = \infty$ | $d_{17} = 0.14$ | $n_{d9} = 1.51633$ | $\nu_{d9} = 64.14$ |
| $r_{18} = \infty$ | $d_{18} = 0.17$ | | |
| $r_{19} = \infty$ (Image Plane) | | | |

Aspherical Coefficients
3 rd Surface
K=0.000
$A_4 = 2.92391 \times 10^{-2}$
$A_6 5.50087 \times 10^{-3}$
$A_8 = 2.35202 \times 10^{-3}$
$A_{10} = 1.37638 \times 10^{-3}$
8 th Surface
K=0.000
$A_4 = -7.56772 \times 10^{-2}$
$A_6 = -5.16916 \times 10^{-2}$
$A_8 = -1.05324 \times 10^{-1}$
$A_{10} = 0$

| | WE | ST | TE |
|---|---|---|---|
| Zooming Data (∞) | | | |
| f (mm) | 1.000 | 1.733 | 3.000 |
| $F_{NO}$ | 2.55 | 3.42 | 4.50 |
| ω (°) | 30.78 | 18.49 | 10.81 |
| D6 | 2.94 | 1.48 | 0.25 |
| D12 | 0.53 | 1.95 | 3.16 |
| D14 | 0.72 | 0.25 | 0.31 |
| Zooming Data (Close-up) | | | |
| D6 | 2.94 | 1.48 | 0.25 |
| D12 | 0.48 | 1.74 | 2.65 |
| D14 | 0.77 | 0.46 | 0.82 |

EXAMPLE 7

| | | | |
|---|---|---|---|
| $r_1 = -220.166$ | $d_1 = 0.15$ | $n_{d1} = 1.77250$ | $\nu_{d1} = 49.60$ |
| $r_2 = 1.244$ (Aspheric) | $d_2 = 0.44$ | | |
| $r_3 = 2.559$ | $d_3 = 0.40$ | $n_{d2} = 1.84666$ | $\nu_{d2} = 23.78$ |
| $r_4 = 6.846$ | $d_4 = D4$ | | |
| $r_5 = \infty$ (Stop) | $d_5 = 0.27$ | | |
| $r_6 = 0.889$ (Aspheric) | $d_6 = 0.55$ | $n_{d3} = 1.80610$ | $\nu_{d3} = 40.92$ |
| $r_7 = 4.149$ | $d_7 = 0.15$ | $n_{d4} = 1.84666$ | $\nu_{d4} = 23.78$ |
| $r_8 = 0.719$ | $d_8 = 0.11$ | | |
| $r_9 = 2.170$ | $d_9 = 0.40$ | $n_{d5} = 1.77250$ | $\nu_{d5} = 49.60$ |
| $r_{10} = -8.691$ | $d_{10} = D10$ | | |
| $r_{11} = 2.917$ | $d_{11} = 0.40$ | $n_{d6} = 1.48749$ | $\nu_{d6} = 70.23$ |
| $r_{12} = -3.604$ | $d_{12} = D12$ | | |
| $r_{13} = \infty$ | $d_{13} = 0.18$ | $n_{d7} = 1.51633$ | $\nu_{d7} = 64.14$ |
| $r_{14} = \infty$ | $d_{14} = 0.33$ | $n_{d8} = 1.54771$ | $\nu_{d8} = 62.84$ |
| $r_{15} = \infty$ | $d_{15} = 0.18$ | | |
| $r_{16} = \infty$ | $d_{16} = 0.17$ | $n_{d9} = 1.51633$ | $\nu_{d9} = 64.14$ |
| $r_{17} = \infty$ | $d_{17} = 0.27$ | | |
| $r_{18} = \infty$ (Image Plane) | | | |

Aspherical Coefficients
2nd Surface
K=0.000
$A_4 = -7.5590 \times 10^{-2}$ $A_6=1.8175\times10^{-2}$
$A_8=-4.1479\times10^{-2}$
$A_{10}=0$
6 th Surface
K=0.000
$A_4=-7.6156\times10^{-2}$
$A_6=1.3955\times10^{-2}$
$A_8=-2.3422\times10^{-1}$
$A_{10}=0$

|  | WE | ST | TE |
|---|---|---|---|
| Zooming Data (∞) | | | |
| f (mm) | 1.000 | 1.923 | 2.851 |
| $F_{NO}$ | 2.65 | 3.50 | 4.51 |
| ω (°) | 35.55 | 20.00 | 13.75 |
| D4 | 2.98 | 0.93 | 0.33 |
| D10 | 0.56 | 1.68 | 3.07 |
| D12 | 0.20 | 0.30 | 0.22 |
| Zooming Data (Close-up) | | | |
| D4 | 2.98 | 0.93 | 0.33 |
| D10 | 0.52 | 1.56 | 2.80 |
| D12 | 0.24 | 0.42 | 0.48 |

EXAMPLE 8

| | | | |
|---|---|---|---|
| $r_1 = 68.1830$ | $d_1 = 0.7000$ | $n_{d1} = 1.74320$ | $v_{d1} = 49.34$ |
| $r_2 = 5.2637$ (Aspheric) | $d_2 = 2.0000$ | | |
| $r_3 = 8.9627$ | $d_3 = 1.8000$ | $n_{d2} = 1.84666$ | $v_{d2} = 23.78$ |
| $r_4 = 15.6301$ | $d_4 = D4$ | | |
| $r_5 = \infty$ (Stop) | $d_5 = 1.2000$ | | |
| $r_6 = 3.2578$ (Aspheric) | $d_6 = 2.0000$ | $n_{d3} = 1.74320$ | $v_{d3} = 49.34$ |
| $r_7 = 2.7435$ | $d_7 = 0.6000$ | | |
| $r_8 = 8.2026$ | $d_8 = 2.0000$ | $n_{d4} = 1.76200$ | $v_{d4} = 40.10$ |
| $r_9 = -3.5116$ | $d_9 = 0.6500$ | $n_{d5} = 1.84666$ | $v_{d5} = 23.78$ |
| $r_{10} = -34.7761$ | $d_{10} = D10$ | | |
| $r_{11} = 16.7864$ | $d_{11} = 0.6500$ | $n_{d6} = 1.84666$ | $v_{d6} = 23.78$ |
| $r_{12} = 9.4111$ | $d_{12} = 1.8000$ | $n_{d7} = 1.80100$ | $v_{d7} = 34.97$ |
| $r_{13} = -70.1350$ | $d_{13} = D13$ | | |
| $r_{14} = \infty$ | $d_{14} = 0.8000$ | $n_{d8} = 1.51633$ | $v_{d8} = 64.14$ |
| $r_{15} = \infty$ | $d_{15} = 1.5000$ | $n_{d9} = 1.54771$ | $v_{d9} = 62.84$ |
| $r_{16} = \infty$ | $d_{16} = 0.8000$ | | |
| $r_{17} = \infty$ | $d_{17} = 0.7500$ | $n_{d10} = 1.51633$ | $v_{d10} = 64.14$ |
| $r_{18} = \infty$ | $d_{18} = 1.2107$ | | |
| $r_{19} = \infty$ (Image Plane) | | | |

Aspherical Coefficients
2 nd Surface
K=0
$A_4=-7.4871\times10^{-4}$
$A_6=1.6887\times10^{-5}$
$A_8=-1.7692\times10^{-6}$
$A_{10}=0.0000$
6th Surface
K=0
$A_4=-1.1760\times10^{-3}$
$A_6=5.5788\times10^{-5}$
$A_8=-2.4495\times10^{-5}$
$A_{10}=0.0000$

|  | WE | ST | TE |
|---|---|---|---|
| Zooming Data (∞) | | | |
| f (mm) | 4.51735 | 8.68968 | 12.89107 |
| $F_{NO}$ | 2.7264 | 3.4585 | 4.5154 |
| ω (°) | 33.2 | 18.3 | 12.4 |
| D4 | 14.10503 | 3.87916 | 1.50000 |
| D10 | 2.53628 | 6.24913 | 13.18371 |
| D13 | 0.92173 | 2.00866 | 0.98271 |
| Zooming Data (Close-up) | | | |
| D4 | 14.10503 | 3.87916 | 1.50000 |
| D10 | 2.20751 | 5.19633 | 10.89708 |
| D13 | 1.25050 | 3.06146 | 3.26934 |

Figure 5A:
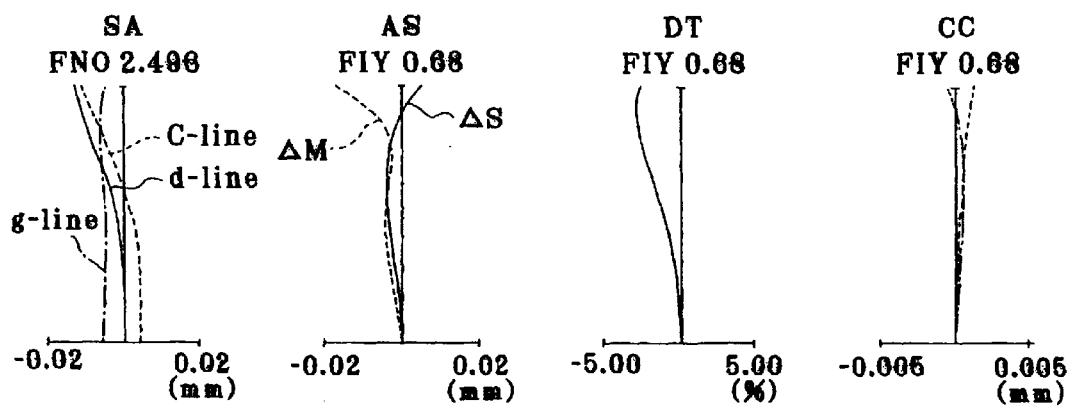
FIGS. 5(a), 5(b) and 5(c) are aberration diagrams for Example 1 at the wide-angle end (a), in an intermediate state (b) and at the telephoto end (c) upon focused on an object point at infinity.
Figure 5B:
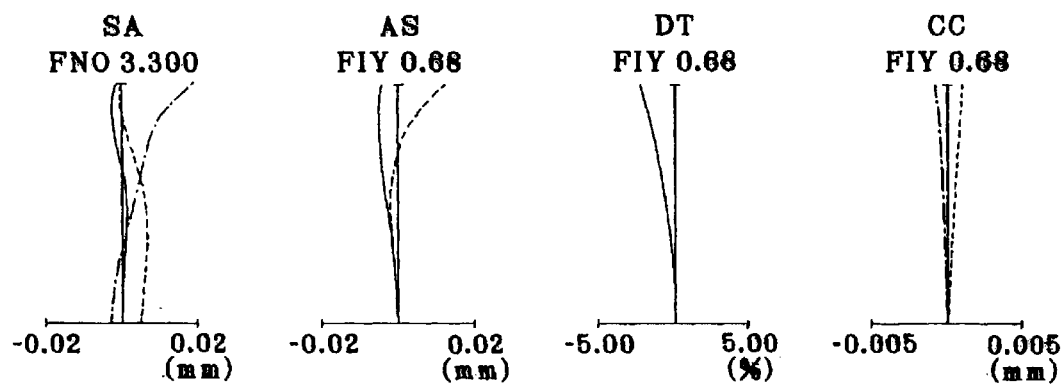
Figure 5C:
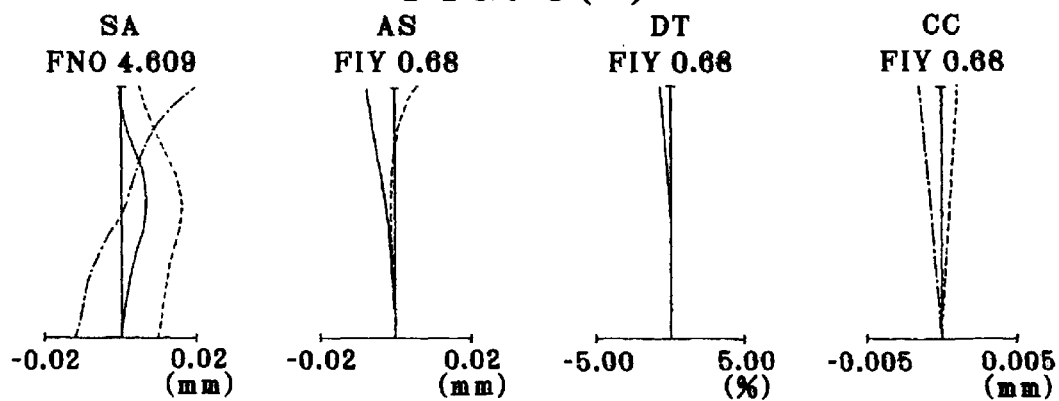
Figure 6A:
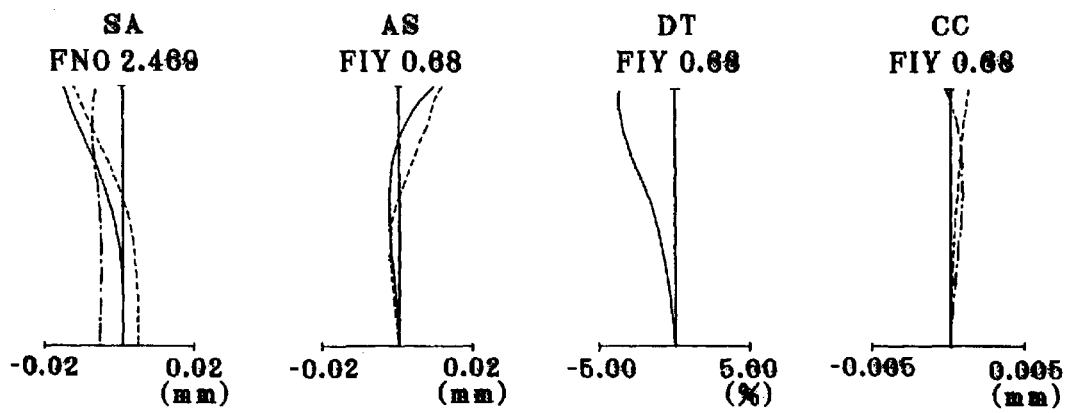
FIGS. 6(a), 6(b) and 6(c) are aberration diagrams for Example 1 at the wide-angle end (a), in an intermediate state (b) and at the telephoto end (c) upon focused on an object distance of 10 cm.
Figure 6B:
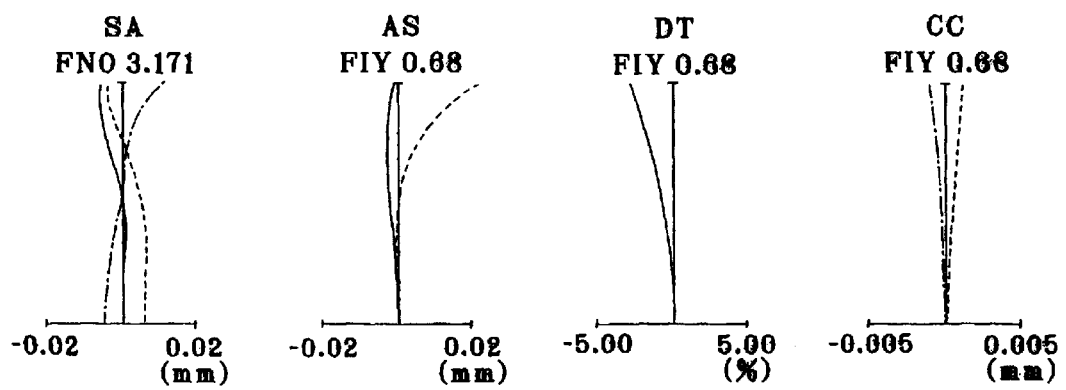
Figure 6C:
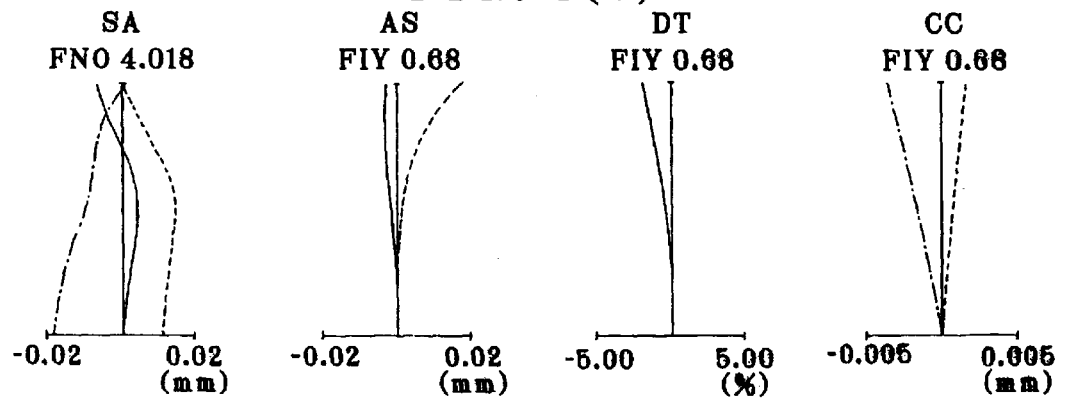
Figure 7A:
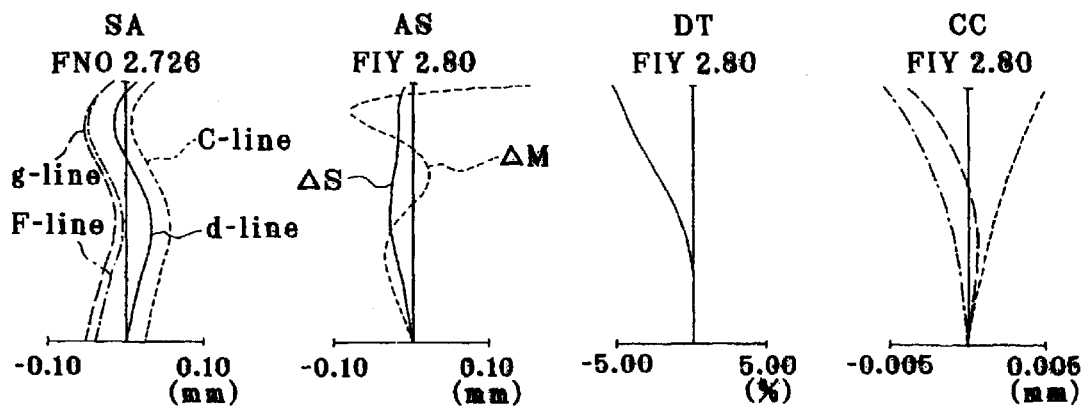
FIGS. 7(a), 7(b) and 7(c) are aberration diagrams for Example 8, similar to FIGS. 5(a) to 5(c).
Figure 7B:
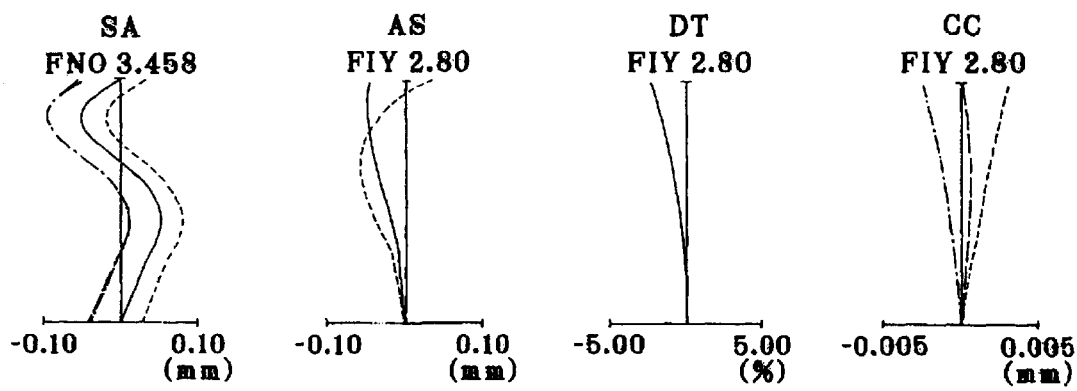
Figure 7C:
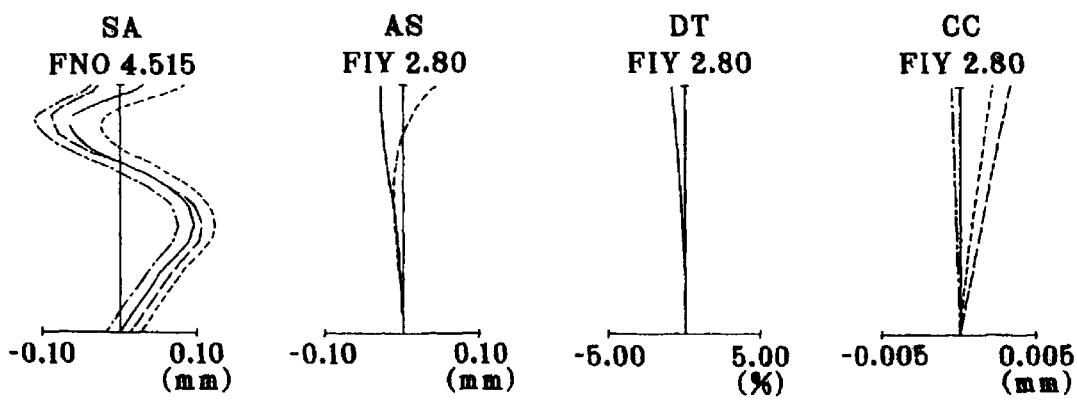
Figure 8A:
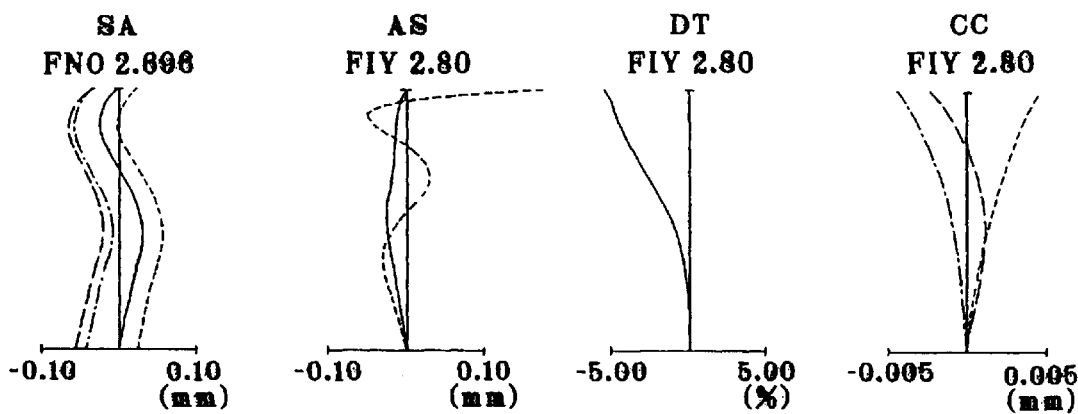
FIGS. 8(a), 8(b) and 8(c) are aberration diagrams for Example 8, similar to FIGS. 6(a) to 6(c).
Figure 8B:
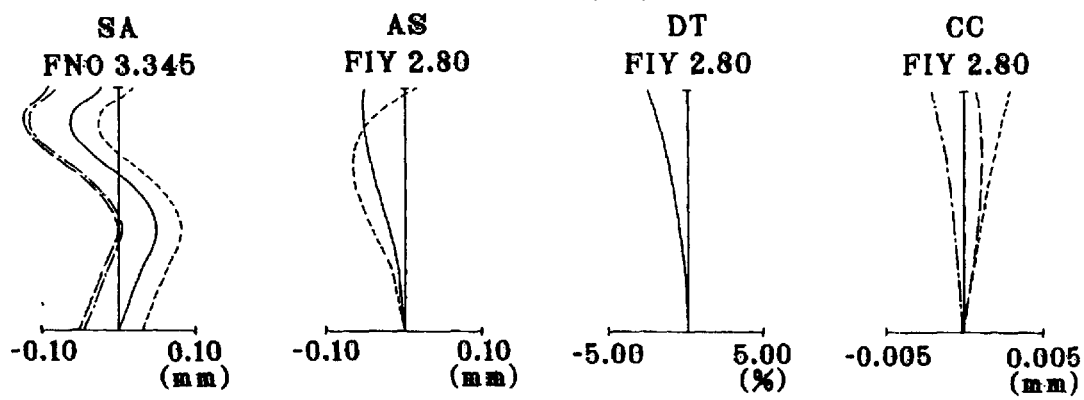
Figure 8C:
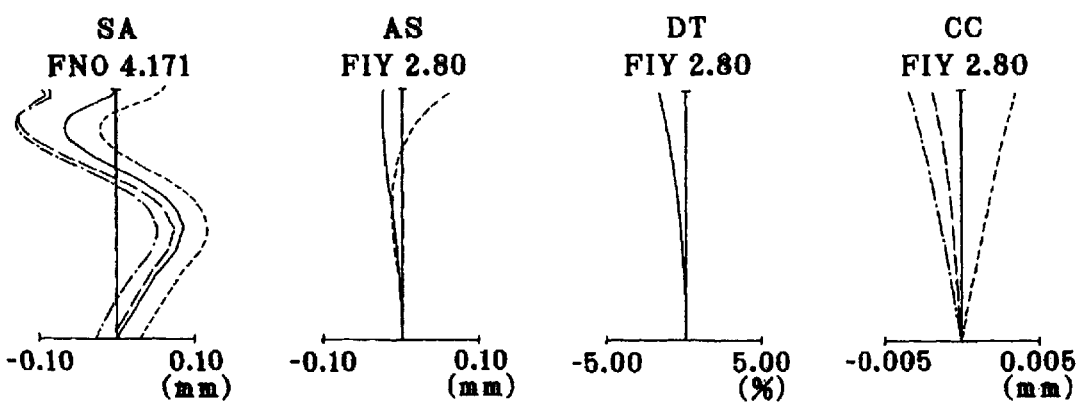

FIGS. 5(*a*), 5(*b*) and 5(*c*) are aberration diagrams for Example 1 upon focused on an infinite object point, and FIGS. 6(*a*), 6(*b*) and 6(*c*) are aberration diagrams for Example 1 upon focused by movement of the third lens group G3 toward the object side on an object distance of 10 cm. Similar aberration diagrams for Example 8 are given in FIGS. 7(*a*), 7(*b*) and 7(*c*) and FIGS. 8(*a*), 8(*b*) and 8(*c*). In these figures, (a), (b) and (c) show spherical aberrations SA, astigmatism AS, distortion DT and chromatic aberration of magnification CC at the wide-angle end, in an intermediate state and at the telephoto end, respectively. "FIY" stands for an image height.

Tabulated below are the values of conditions (1) through (9) and conditions (a) through (p) as well as the values of a in μm and L mm.

| | | | | | Example | | | | |
|---|---|---|---|---|---|---|---|---|---|
| | | 1 | 4 | 3 | 4 | 5 | 6 | 7 | 8 |
| (1) | | 0.89633 | 0.89978 | 0.90654 | 0.88412 | 0.88990 | 0.89294 | 0.80877 | 0.84213 |
| (2) | | 0.23382 | 0.24854 | 0.17893 | 0.16675 | 0.31690 | 0.28175 | 0.32827 | — |
| (3) | | 0.04056 | 0.04056 | 0.04056 | 0.04056 | 0.04056 | 0.04056 | 0.04056 | — |
| (4) | | 23.78 | 23.78 | 23.78 | 23.78 | 23.78 | 23.78 | 23.78 | — |
| (5) | | 0.24492 | 0.27629 | 0.28816 | 0.12488 | 0.16002 | 0.23271 | -0.60048 | -0.61829 |
| (6) | | 18.2880 | 19.1034 | 20.2971 | 16.1862 | 17.1767 | 17.6776 | 9.44392 | 11.6689 |
| (7) | | 0.53146 | 0.51842 | 0.44472 | 0.41401 | 0.47203 | 0.47681 | 0.67688 | 0.60939 |
| (8) | | 0.20090 | 0.16976 | 0.18206 | 0.13602 | 0.12331 | 0.12311 | 0.05375 | 0.05972 |
| (9) | | 0.72519 | 0.71345 | 0.97105 | 1.07385 | 0.52802 | 0.60735 | 0.63366 | — |
| (a) | | 1.01086 | 0.99296 | 1.01047 | 1.03140 | 1.00641 | 1.00032 | 1.02977 | 0.97769 |
| (b) | | 0.13080 | 0.14473 | 0.13513 | 0.13293 | 0.14680 | 0.14762 | 0.12723 | — |
| (c) | | 0.83754 | 0.75761 | 0.81068 | 0.82477 | 0.74682 | 0.80051 | 0.89272 | 0.9375 |

-continued

| | Example | | | | | | | |
|---|---|---|---|---|---|---|---|---|
| | 1 | 4 | 3 | 4 | 5 | 6 | 7 | 8 |
| (d) | −1.40568 | −1.35430 | −1.42694 | −1.46599 | −1.37508 | −1.36830 | −1.66044 | −1.56687 |
| (e) | 2.4674 | 2.3824 | 2.3749 | 2.1680 | 2.2125 | 2.2086 | 2.3520 | 2.33980 |
| (f) | 0.14242 | 0.05732 | *** | 0.11452 | 0.12742 | 0.10275 | −0.00454 | 0.06625 |
| (g) | 0.3309 | 0.2789 | *** | 0.2298 | 0.3442 | 0.3339 | 0.4421 | 0.4427 |
| (h) | 0.55475 | 0.59356 | *** | 0.54356 | 0.64378 | 0.66331 | *** | 0.58729 |
| (i) | 0.14 | 0.11 | *** | 0.14 | 0.08 | 0.09 | *** | — |
| (j) | *** | *** | *** | *** | *** | *** | −2.19417 | −3.68851 |
| (k) | *** | *** | *** | *** | *** | *** | 1.77250 | 1.74320 |
| (l) | *** | *** | −0.06792 | *** | *** | *** | *** | — |
| (m) | −0.80570 | −0.09685 | −0.82114 | −0.18363 | −0.13548 | 0.00000 | −0.10531 | −0.61376 |
| (n) | 0.89306 | 0.77586 | 0.79914 | 0.92584 | 0.80029 | 0.79008 | 1.22222 | 1.16667 |
| (o) | 0.93783 | 0.97647 | 1.01445 | 0.89085 | 0.93318 | 0.94003 | 0.73040 | 0.80357 |
| (p) | 0.36 | 0.36 | 0.36 | 0.36 | 0.36 | 0.36 | 0.3604 | 0.3604 |
| | (a = 0.75) | (a = 0.75) | (a = 0.75) | (a = 0.75) | (a = 0.75) | (a = 0.75) | (a = 0.92) | (a = 0.92) |
| L | 1.362 | 1.362 | 1.362 | 1.260 | 1.260 | 1.260 | 1.362 | 5.6 |

In Examples 1 to 6 a=0.75, and in Examples 7 and 8 a=0.92; however, it is understood that throughout these examples, the value of a may be selected from the range of 0.4<a<1.0 (μm).

It is noted that in Examples 1 to 8, the low-pass filter has a total thickness of 1.500 (mm) and a triple-layer structure. It is also appreciated that many modifications may be made to the aforesaid examples without departing from the scope of the invention. For instance, the low-pass filter may be formed of one single low-pass filter element.

Figure 9:
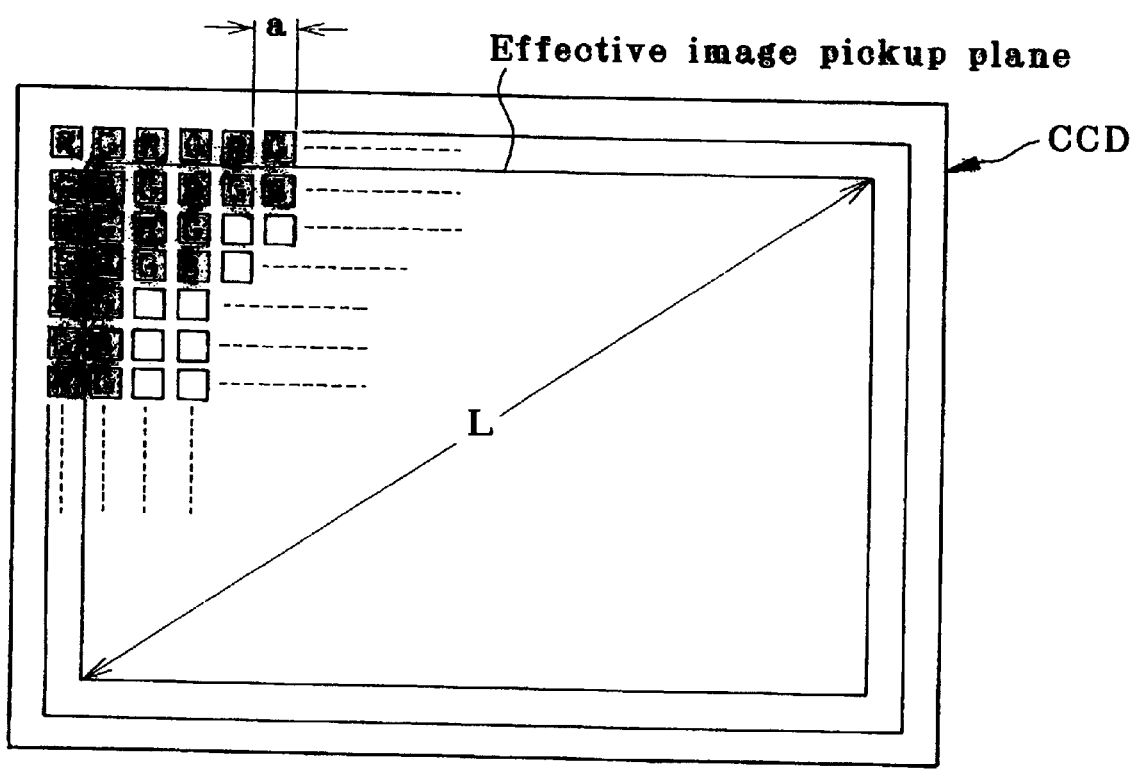
FIG. 9 is illustrative of the diagonal length of the effective image pickup plane of an electronic image pickup device upon phototaking.

Here the diagonal length L of the effective image pickup plane and the pixel spacing a are explained. FIG. 9 is illustrative of one exemplary pixel array of an image pickup device, wherein R (red), G (green) and B (blue) pixels or four cyan, magenta, yellow and green (G) pixels are mosaically arranged at the pixel spacing a. The "effective image pickup plane" used herein is understood to mean a certain area in the photoelectric conversion surface on an image pickup device used for the reproduction of a phototaken image (on a personal computer or by a printer). The effective image pickup plane shown in FIG. 9 is set at an area narrower than the total photoelectric conversion surface on the image pickup device, depending on the performance of the optical system used (an image circle that can be ensured by the performance of the optical system). The diagonal length L of an effective image pickup plane is thus defined by that of this effective image pickup plane. Although the image pickup range used for image reproduction may be variable, it is noted that when the zoom lens of the invention is used on an image pickup system having such functions, the diagonal length L of its effective image pickup plane varies. In that case, the diagonal length L of the effective image pickup plane according to the invention is defined by the maximum value in the widest possible range for L.

The infrared cut means includes an infrared cut absorption filter IF and an infrared sharp cut coat. The infrared cut absorption filter IF is formed of a glass having an infrared absorber therein, and the infrared sharp cut coat cuts infrared rays by reflection rather than by absorption. Instead of this infrared cut absorption filter IF, it is thus acceptable to use a low-pass filter LF or dummy transparent plane plate with an infrared sharp cut coat applied directly thereon.

Preferable in this case, the near-infrared sharp cut coat is designed to have a transmittance of at least 80% at 600 nm wavelength and a transmittance of up to 10% at 700 nm wavelength. More specifically, the near-infrared sharp cut coat has a multilayer structure made up of such 27 layers as mentioned below; however, the design wavelength is 780 nm.

| Substrate | Material | Physical Thickness (nm) | λ/4 |
|---|---|---|---|
| 1st layer | Al$_2$O$_3$ | 58.96 | 0.50 |
| 2nd layer | TiO$_2$ | 84.19 | 1.00 |
| 3rd layer | SiO$_2$ | 134.14 | 1.00 |
| 4th layer | TiO$_2$ | 84.19 | 1.00 |
| 5th layer | SiO$_2$ | 134.14 | 1.00 |
| 6th layer | TiO$_2$ | 84.19 | 1.00 |
| 7th layer | SiO$_2$ | 134.14 | 1.00 |
| 8th layer | TiO$_2$ | 84.19 | 1.00 |
| 9th layer | SiO$_2$ | 134.14 | 1.00 |
| 10th layer | TiO$_2$ | 84.19 | 1.00 |
| 11th layer | SiO$_2$ | 134.14 | 1.00 |
| 12th layer | TiO$_2$ | 84.19 | 1.00 |
| 13th layer | SiO$_2$ | 134.14 | 1.00 |
| 14th layer | TiO$_2$ | 84.19 | 1.00 |
| 15th layer | SiO$_2$ | 178.41 | 1.33 |
| 16th layer | TiO$_2$ | 101.03 | 1.21 |
| 17th layer | SiO$_2$ | 167.67 | 1.25 |
| 18th layer | TiO$_2$ | 96.82 | 1.15 |
| 19th layer | SiO$_2$ | 147.55 | 1.05 |
| 20th layer | TiO$_2$ | 84.19 | 1.00 |
| 21st layer | SiO$_2$ | 160.97 | 1.20 |
| 22nd layer | TiO$_2$ | 84.19 | 1.00 |
| 23rd layer | SiO$_2$ | 154.26 | 1.15 |
| 24th layer | TiO$_2$ | 95.13 | 1.13 |
| 25th layer | SiO$_2$ | 160.97 | 1.20 |
| 26th layer | TiO$_2$ | 99.34 | 1.18 |
| 27th layer | SiO$_2$ | 87.19 | 0.65 |

Air

Figure 10:
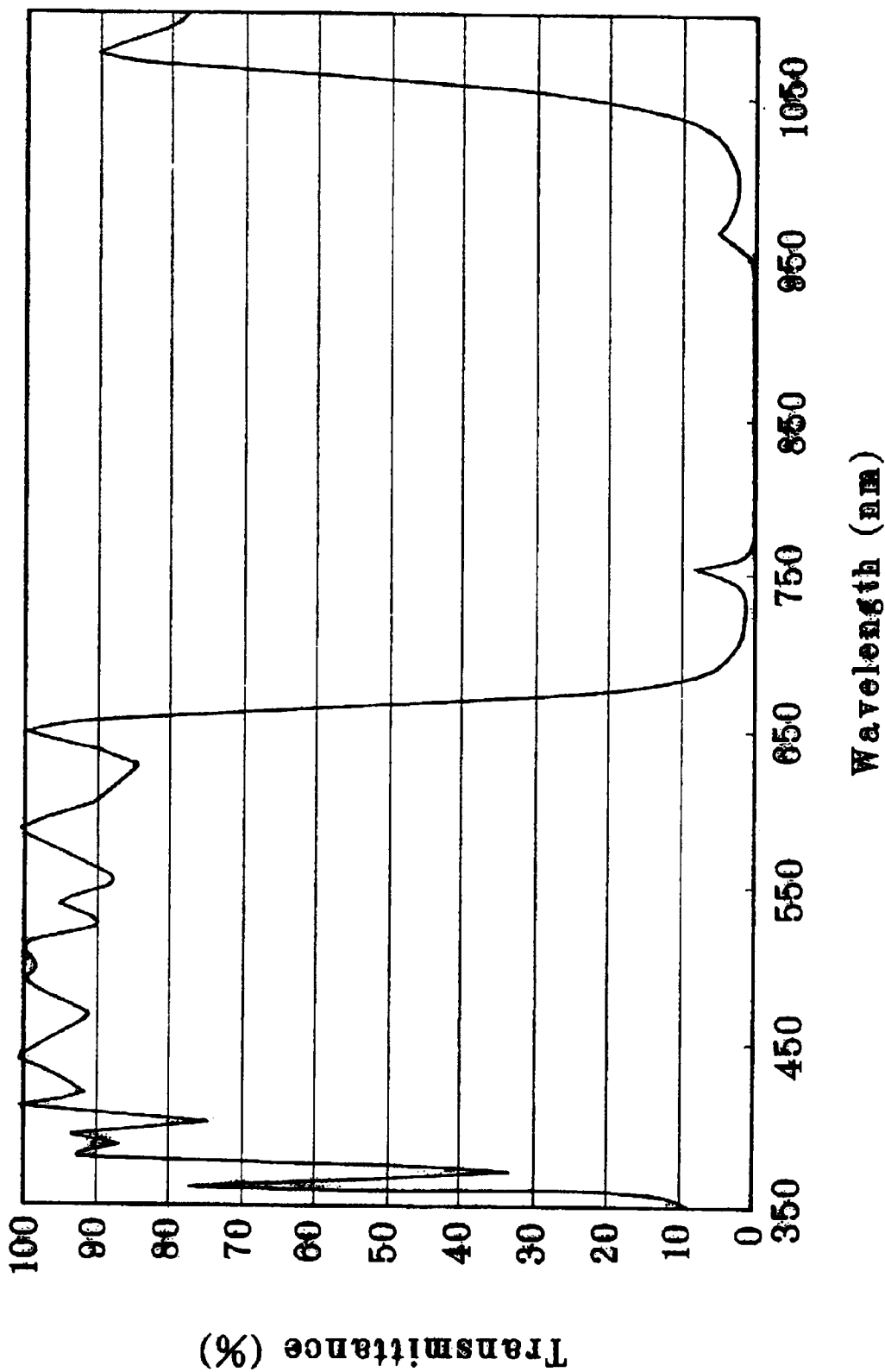
FIG. 10 is a diagram indicative of the transmittance characteristics of one example of the near-infrared sharp cut coat.

The aforesaid near-infrared sharp cut coat has such transmittance characteristics as shown in FIG. 10.

Figure 11:
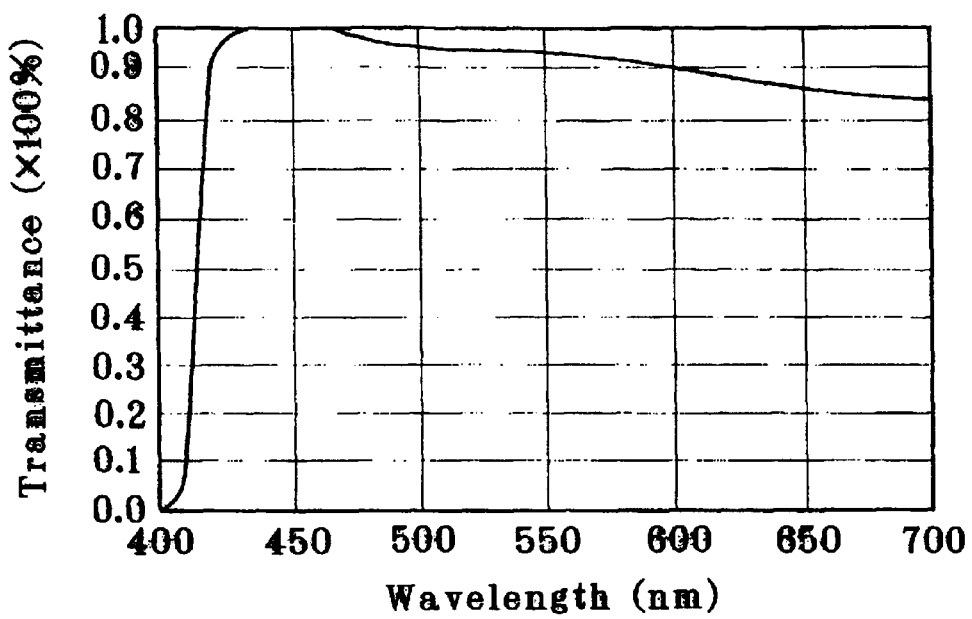
FIG. 11 is a diagram indicative of the transmittance characteristics of one example of the color filter located on the exit surface side of the low-pass filter.

The low-pass filter LF is provided on its exit surface side with a color filter or coat for reducing the transmission of colors at such a short wavelength region as shown in FIG. 11, thereby further enhancing the color reproducibility of an electronic image.

Preferably, that filter or coat should be designed such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for image pickup systems using a complementary colors mosaic filter.

In each of the aforesaid examples, coating is applied such that, as shown in FIG. 11, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter LF is made up of three different filter elements stacked one upon another in the optical axis direction, each filter element having crystallographic axes in directions where, upon projected onto the image plane, the azimuth angle is horizontal (=0°) and ±45° therefrom. Three such filter elements are mutually displaced by a μm in the horizontal direction and by SQRT(½)×a in the ±45° direction for the purpose of moiré control, wherein SQRT means a square root.

Figure 12:
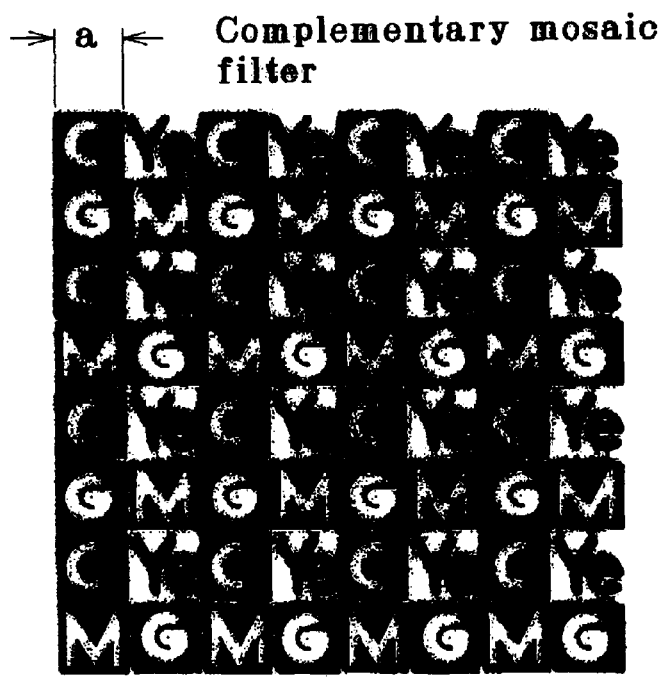
FIG. 12 is a schematic illustrative of how the color filter elements are arranged in the complementary colors filter.

The image pickup plane I of a CCD is provided thereon with a complementary mosaic filter wherein, as shown in FIG. 12, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 12, which should preferably have such characteristics as given below.

Each green color filter element G has a spectral strength peak at a wavelength $G_P$, each yellow filter element $Y_e$ has a spectral strength peak at a wavelength $Y_P$, each cyan filter element C has a spectral strength peak at a wavelength $C_P$, and each magenta filter element M has spectral strength peaks at wavelengths $M_{P1}$ and $M_{P2}$, and these wavelengths satisfy the following conditions.

510 nm<$G_P$<540 nm 5 nm<$Y_P$−$G_P$<35 nm

−100 nm<$C_P$−$G_P$<−5 nm 430 nm<$M_{P1}$<480 nm 580 nm<$M_{P2}$<640 nm

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 13:
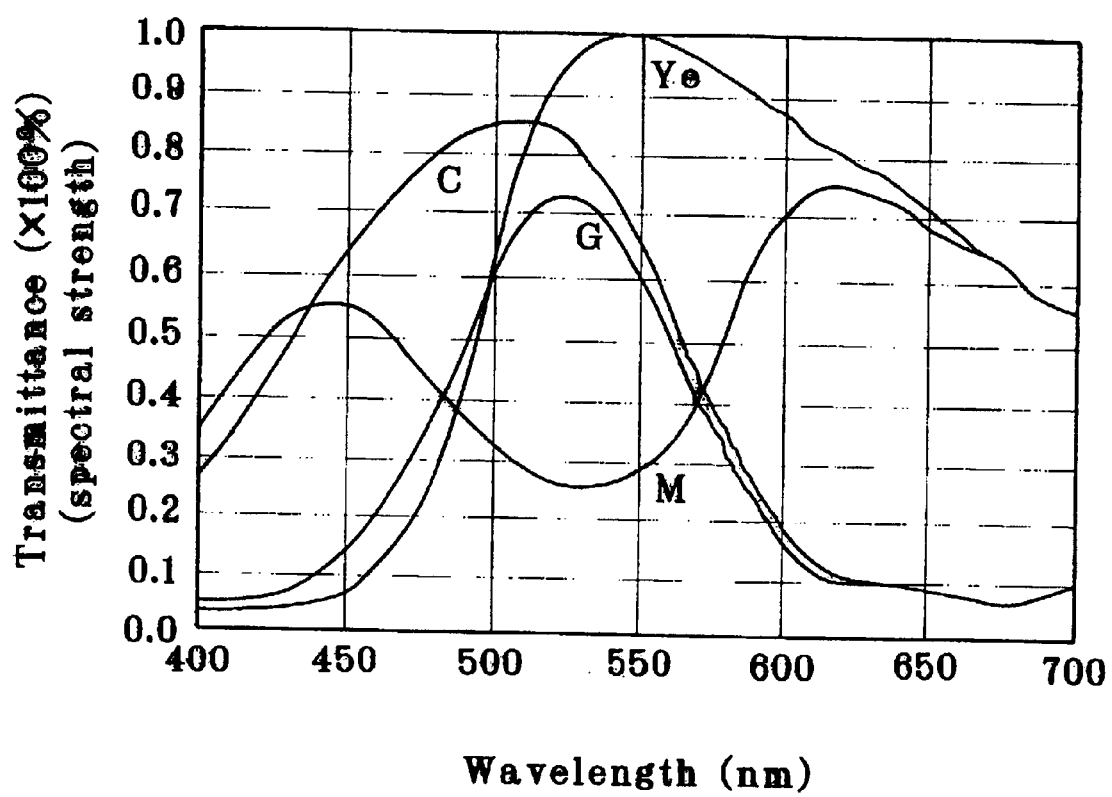
FIG. 13 is a diagram indicative of one example of the wavelength characteristics of the complementary colors mosaic filter.

One example of the wavelength characteristics in the aforesaid respective examples is shown in FIG. 13. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras). For luminance signals, $$Y=|G+M+Y_e+C|\times 1/4$$

For chromatic signals, $$R-Y=|(M+Y_e)-(G+C)|$$

$$B-Y=|(M+C)-(G+Y_e)|$$

Through this signal processing, the signals from the complementary colors filter are converted into R (red), G (green) and B (blue) signals.

In this regard, it is noted that the aforesaid near-infrared sharp cut coat may be located anywhere on the optical path, and that the number of low-pass filters LF may be either two as mentioned above or one.

The electronic imaging system constructed as described above may be applied to phototaking systems where object images formed through zoom lenses are received at image pickup devices such as CCDs, inter alia, digital cameras or video cameras as well as PCs and telephone sets which are typical information processors, in particular, easy-to-carry cellular phones. A specific embodiment is now given.

Figure 14:
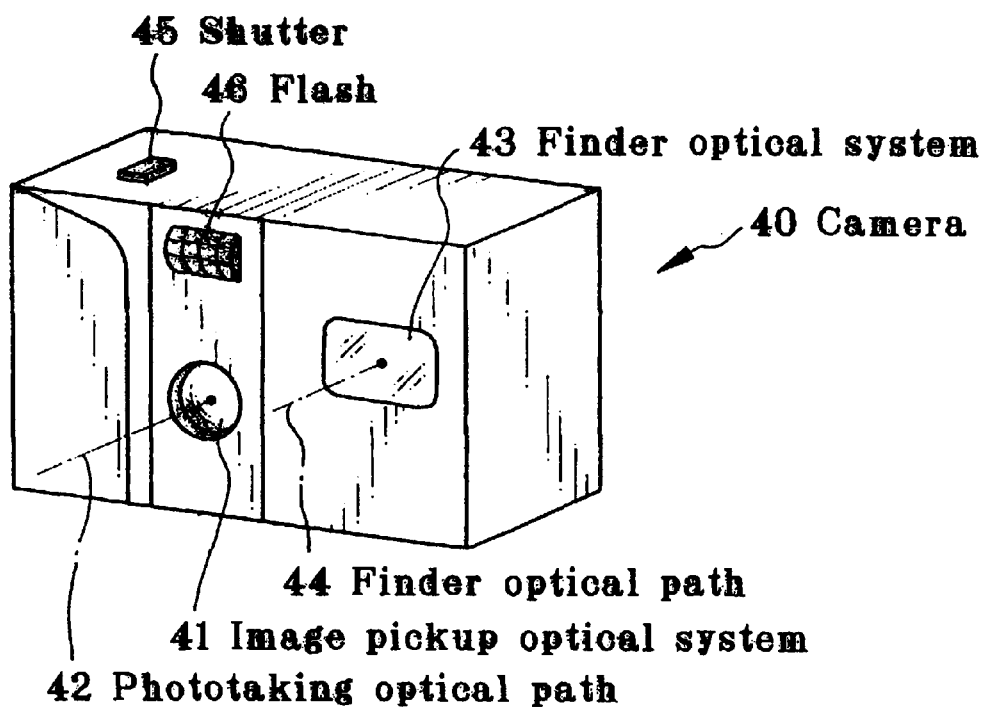
FIG. 14 is a front perspective schematic illustrative of the outside shape of a digital camera with the inventive zoom lens built therein.
Figure 15:
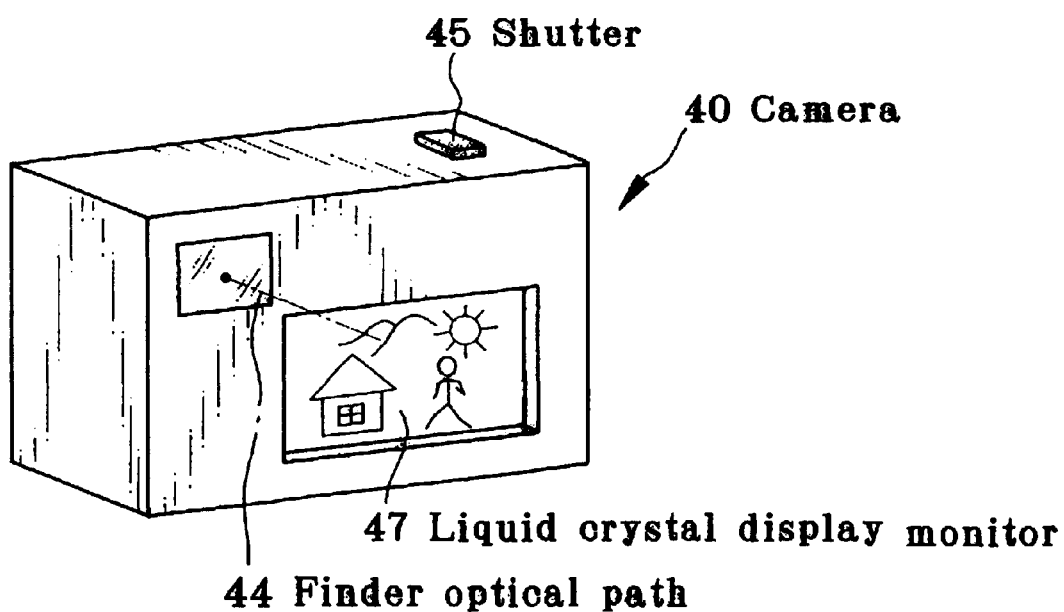
FIG. 15 is a rear perspective schematic of the digital camera of FIG. 14.
Figure 16:
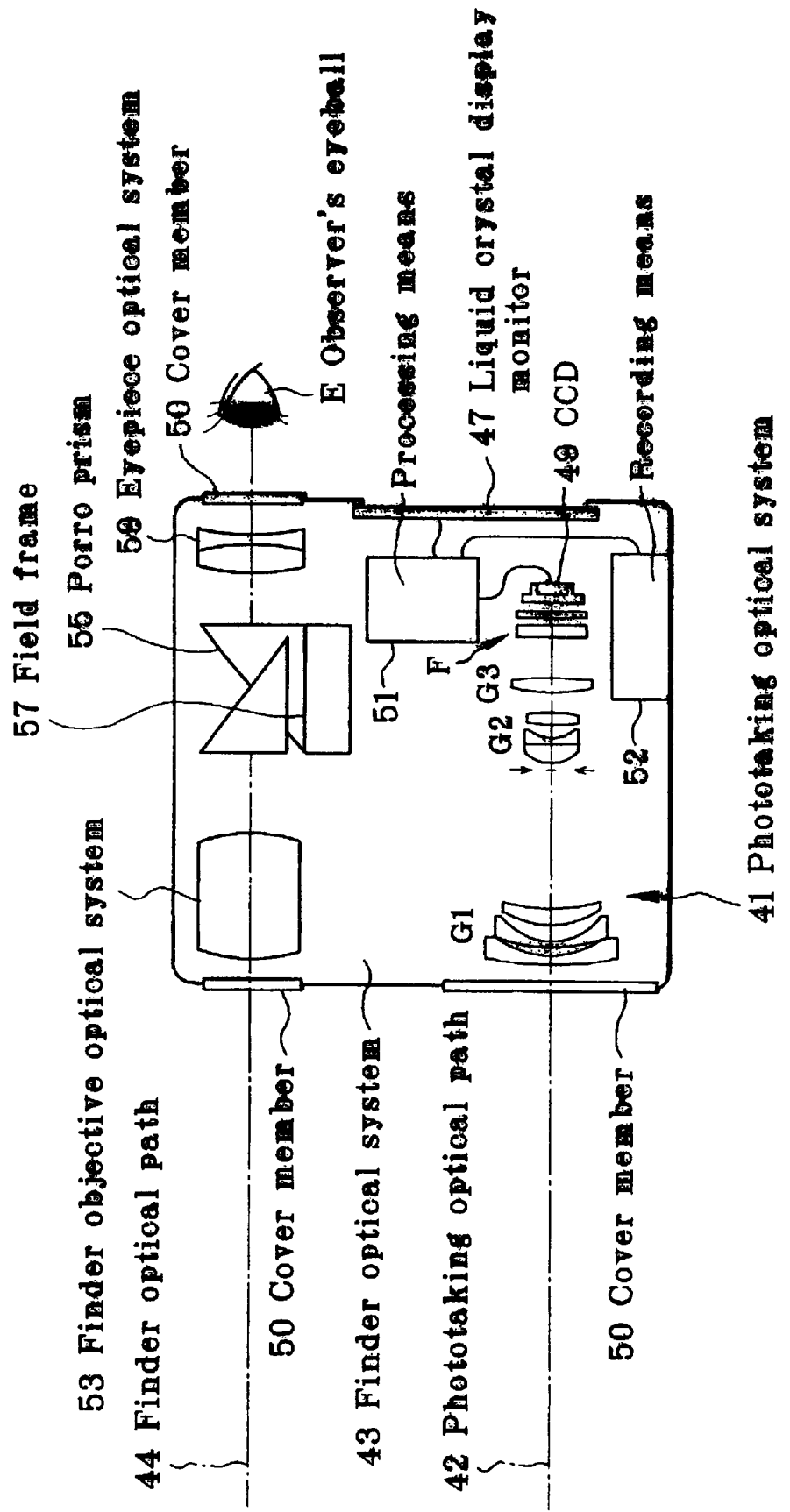
FIG. 16 is a sectional schematic of the digital camera of FIG. 14.

FIGS. 14, 15 and 16 are conceptual illustrations of a phototaking optical system 41 for digital cameras, in which the zoom lens of the present invention is incorporated. FIG. 14 is a front perspective view of the outside shape of a digital camera 40, and FIG. 15 is a rear perspective view of the same. FIG. 16 is a sectional view of the construction of the digital camera 40. In this embodiment, the digital camera 40 comprises a photo-taking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens according to Example 1. An object image formed by the phototaking optical system 41 is formed on the image pickup plane of a CCD 49 via an infrared cut absorption filter IF comprising a dummy transparent plane plate provided thereon with a near-infrared cut coat and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed such that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

In the embodiment of FIG. 16, plane-parallel plates are used as the cover members 50; however, it is acceptable to use powered lenses.

As can be appreciated from the foregoing explanation, the present invention can provide a zoom lens that is received in a collapsible lens mount with smaller thickness and efficiency, has high magnifications and is excellent in image-formation capability even on rear focusing, and enables video cameras or digital cameras to be thoroughly slimmed down.

What we claim is:

1. A zoom lens comprising, in order from an object side thereof, a first lens group having negative refracting power, a second lens group having positive refracting power and a third lens group having positive refracting power, wherein for zooming from a wide-angle end to a telephoto end of the zoom lens upon focused on an infinite object point, the second lens group moves toward the object side alone and the third lens group moves in a locus different from that of the second lens group with a varying spacing between adjacent lens groups, wherein:

the second lens group comprises two lens components, i.e., an object side-lens component and an image side-lens component, one of which is composed of a cemented lens component consisting of a positive lens element and a negative lens element and the other consists only of a positive single lens component, and the object side-lens component satisfies condition (1):

$$0.6 < R_{2FR}/R_{2FF} < 1.05 \quad (1)$$

where $R_{2FF}$ is an axial radius of curvature of an object side-surface of the object side-lens component in the second lens group, and $R_{2FR}$ is an axial radius of curvature of an image side-surface of the object side-lens component in the second lens group.

2. The zoom lens according to claim 1, wherein the object side-lens component comprises a cemented lens component, and the image side-lens component consists only of a positive single lens component with satisfaction of condition (5):

$$-1.0 < (R_{2RF}+R_{2RR})/(R_{2RF}-R_{2RR}) < 0.6 \quad (5)$$

where $R_{2RF}$ and $R_{2RR}$ are axial radii of curvature of an object side-surface and an image side-surface of the image side-lens component in the second lens group, respectively.

3. The zoom lens according to claim 1, which satisfies condition (6):

$$5 < (R_{2FF}+R_{2FR})/(R_{2FF}-R_{2FR}) < 0.6 \quad (6)$$

where $R_{2FF}$ is an axial radius of curvature of a surface located nearest to an object side of the object side-lens component in the second lens group, and $R_{2FR}$ is an axial radius of curvature of a surface located nearest to an image side of the object side-lens component in the second lens group.

4. The zoom lens according to claim 1, which satisfies conditions (7) and (8):

$$0.15 < f_{2R}/f_{3O} < 1.0 \quad (7)$$

$$0.03 < d_{2FR} \times R_{2FR}/t_2^2 < 1.5 \quad (8)$$

where $f_{2R}$ is a focal length of the image side-lens component in the second lens group, $f_{3O}$ is a focal length of the third lens group, $d_{2FR}$ is a spacing between an image side-surface of the object side-lens component and an object side-surface of the image side-lens component in the second lens group, $R_{2FR}$ is an axial radius of curvature of an image side-surface of the object side-lens component in the second lens group, and $t_2$ is an axial distance of the second lens group from a surface located nearest to the object side from a surface located nearest to the image side of the second lens group.

5. The zoom lens according to claim 1, which satisfies condition (9):

$$0.2 < R_{2FC}/f_{2F} < 2 \quad (9)$$

where $R_{2FC}$ is a radius of curvature of a cementing surface in the object side-lens component in the second lens group, and $f_{2F}$ is a focal length of the object side-lens component in the second lens group.

6. The zoom lens according to claim 1, wherein the object side-lens component in the second lens group is composed of the cemented lens component, and upon zooming from the wide-angle end to the telephoto end, the third lens group moves in a convex locus toward the image side.

7. The zoom lens according to claim 1, wherein focusing is performed by movement of the third lens group.

8. The zoom lens according to claim 1, which further comprises a stop that moves together with the second lens group.

9. The zoom lens according to claim 1, wherein a lens surface located nearest to an object side of the second lens group is defined by an aspheric surface.

10. The zoom lens according to claim 2, which satisfies condition (5)' instead of condition (5):

$$-0.7 < (R_{2RF}+R_{2RR})/(R_{2RF}-R_{2RR}) < 0.34 \quad (5)'$$

11. The zoom lens according to claim 1, wherein the first lens group includes only one aspheric surface, the second lens group includes only one aspheric surface, and the third lens group consists only of a spherical lens.

12. The zoom lens according to claim 3, which satisfies condition (6)' instead of condition (6):

$$7 < (R_{2FF}+R_{2FR})/(R_{2FF}-R_{2FR}) < 60 \quad (6)'$$

13. The zoom lens according to claim 4, which satisfies condition (7)' instead of condition (7):

$$0.15 < f_{2R}/f_{3O} < 1.0 \quad (7)'$$

14. The zoom lens according to claim 4, which satisfies condition (8)' instead of condition (8):

$$0.05 < d_{2FR} \times R_{2FR}/t_2^2 < 0.3 \quad (8)'$$

15. The zoom lens according to claim 5, which satisfies condition (9)' instead of condition (9):

$$0.3 < R_{2FC}/f_{2F} < 1.6 \quad (9)'$$

16. The zoom lens according to claim 1, which satisfies condition (a):

$$0.0 < f_2/f_{2R} < 1.3 \quad (a)$$

where $f_2$ is a composite focal length of the second lens group, and $f_{2R}$ is a focal length of the image side-lens component in the second lens group.

17. The zoom lens according to claim 1, wherein the object side-lens component in the second lens group comprises the cemented lens component, wherein the cemented lens component consists of, in order from an object side thereof, a positive lens element and a negative lens element and satisfies condition (b):

$$0.04 < t_{2N}/t_2 < 0.2 \quad (b)$$

where $t_{2N}$ is an axial distance of the second lens group from an image side-surface of the cemented positive lens element of the object side-lens component in the second lens group to an image side-surface of the negative lens element thereof, and $t_2$ is an axial distance of the second lens group from a surface located nearest to the object side thereof to a surface located nearest to the image side thereof.

18. The zoom lens according to claim 1, which has a zoom ratio of at least 2.3 and satisfies conditions (d) and (e):

$$1.2 < -\beta_{2t} < 2.0 \quad (d)$$

$$1.6 < f_2/f_W < 3.0 \quad (e)$$

where $\beta_{2t}$ is a magnification of the second lens group at the telephoto end upon focused at an infinite object point, $f_2$ is a focal length of the second lens group, and $f_W$ is a focal length of the zoom lens at the wide-end angle upon focused on an infinite object point.

19. The zoom lens according to claim 1, wherein the first lens group comprises, in order from an object side thereof, a negative lens subgroup comprising up to two negative lens components and a positive lens subgroup consisting of one single lens component having positive refracting power, wherein the negative lens subgroup includes an aspheric surface.

20. The zoom lens according to claim 18, wherein the first lens group satisfies conditions (f) and (g):

$$-0.03 < f_W/R_{11} < 0.4 \quad (f)$$

$$0.15 < d_{NP}/f_W/1.0 \quad (g)$$

where $R_{11}$ is a axial radius of curvature of a first lens surface as counted from the object side of the first lens group, $d_{NP}$ is an axial air separation between the negative lens subgroup and the positive lens subgroup in the first lens group, and $f_W$ is a focal length of the zoom lens at the wide-angle end upon focused on an infinite object point.

21. The zoom lens according to claim 1, wherein the first lens group consists of, in order from an object side thereof, two negative meniscus lens components each convex on an object side thereof and one single lens component having positive refracting power, wherein any one surface of the two negative meniscus lens components facing an air separation is defined by an aspheric surface.

22. The zoom lens according to claim 21, wherein the first lens group satisfies conditions (h) and (i):

$$0.4 < R_{12}/R_{13} < 1.3 \quad (h)$$

$$0.02 < d_{NN}/f_W < 0.25 \quad (i)$$

where $R_{12}$ is an axial radius of curvature of a lens surface on an image side of a negative meniscus lens component on the object side of the first lens group, $R_{13}$ is an axial radius of curvature of a lens surface on an object side of a second negative meniscus lens component as counted from the object side of the first lens group, $d_{NN}$ is an amount of an air separation between the two negative meniscus lens components as measured along an optical axis, and $f_W$ is a focal length of the zoom lens at the wide-angle end upon focused on an infinite object point.

23. The zoom lens according to claim 1, wherein the first lens group comprises, in order from an object side thereof, one negative meniscus lens component convex on an object side thereof and one single lens component having positive refracting power, and satisfies conditions (j) and (k):

$$-5.0 < (R_{1P1} + R_{1P2})/(R_{1P1} - R_{1P2}) < -1.3 \quad (j)$$

$$1.7 < n_{d1N} < 1.95 \quad (k)$$

where $R_{1P1}$ and $R_{1P2}$ are axial radii of curvature of an object side and an image side of the single lens component having positive refracting power in the first lens group, respectively, and $n_{d1N}$ is a d-line refractive index of the negative meniscus lens component in the first lens group.

24. The zoom lens according to claim 1, wherein the first lens group comprises, in order from an object side thereof, a single lens component having weak refracting power and satisfying condition (1), one negative single lens component and one positive single lens component:

$$-0.2 < f_W/f_{1*} < 0.3 \quad (1)$$

where $f_{1*}$ is a focal length of the single lens component having weak refracting power in the first lens group, and $f_W$ is a focal length of the zoom lens at the wide-angle end upon focused on an infinite object point.

25. The zoom lens according to claim 1, wherein the third lens group consists only of a positive single lens component configured such as to satisfy condition (m), wherein both surfaces of the positive single lens component are defined by aspheric surfaces:

$$-1 < (R_{31} + R_{32})/(R_{31} - R_{32}) < 1 \quad (m)$$

where $R_{31}$ is an axial radius of curvature of a lens surface on an object side of the positive single lens component in the third lens group, and $R_{32}$ is an axial radius of curvature of a lens surface on an image side of the positive single lens component in the third lens group.

26. An electronic imaging system, comprising a zoom lens as recited in claim 1 and an image pickup device located on an image side of the zoom lens.

27. The electronic imaging system according to claim 26, wherein the zoom lens satisfies condition (c):

$$0.5 < t_2/L < 1.2 \quad (c)$$

where $t_2$ is an axial distance of the second lens group from a surface located nearest to an object side thereof to a surface located nearest to an image side thereof, and L is a diagonal length of an effective image pickup area of the image pickup device.

28. The electronic imaging system according to claim 26, wherein the zoom lens satisfies conditions (n) and (o):

$$0.5 < t_2/t_1 < 1.5 \tag{n}$$

$$0.4 < t_1/L < 1.3 \tag{o}$$

where $t_1$ is an axial distance of the first lens group from a lens surface located nearest to an object side thereof to a lens surface located nearest to an image side thereof, $t_2$ is an axial distance of the second lens group from a surface located nearest to an object side thereof to a surface located nearest to an image side thereof, and L is a diagonal length of an effective image pickup area of the image pickup device.

29. The electronic imaging system according to claim 26, wherein an object side-lens component of the second lens group in the zoom lens consists of the cemented lens-component, and satisfies conditions (2), (3) and (4):

$$0 < L/R_{2FC} < 0.8 \tag{2}$$

$$0.01 < n_{2FN} - n_{2FP} < 0.2 \tag{3}$$

$$v_{2FN} < 26.5 \tag{4}$$

where L is a diagonal length of a (substantially rectangular) effective image pickup area of the image pickup device, $R_{2FC}$ is an axial radius of curvature of a cementing surface in the object side-lens component in the second lens group, $n_{2FP}$ and $n_{2FN}$ are d-line refractive indices of the positive and negative lens elements of the object side-lens component in the second lens group, respectively, and $v_{2FN}$ is a d-line based Abbe number of the negative lens element of the object side-lens component in the second lens group.

* * * * *

UNITED STATES PATENT AND TRADEMARK OFFICE
CERTIFICATE OF CORRECTION

PATENT NO. : 6,744,564 B2
DATED : June 1, 2004
INVENTOR(S) : Mihara et al.

It is certified that error appears in the above-identified patent and that said Letters Patent is hereby corrected as shown below:

Column 32,
Line 4, replace "0.6" with -- 60 --.

Signed and Sealed this

Twenty-fourth Day of May, 2005

JON W. DUDAS
*Director of the United States Patent and Trademark Office*